US009751968B2

(12) United States Patent
Kato et al.

(10) Patent No.: US 9,751,968 B2
(45) Date of Patent: Sep. 5, 2017

(54) VINYL ALCOHOL POLYMER, THICKENING AGENT, STABILIZER FOR EMULSION POLYMERIZATION, STABILIZER FOR SUSPENSION POLYMERIZATION, COATING AGENT, COATED ARTICLE, SIZING AGENT FOR FIBERS, SIZED YARN, AND PRODUCTION METHOD OF TEXTILE

(71) Applicant: KURARAY CO., LTD., Kurashiki-shi (JP)

(72) Inventors: Masaki Kato, Kurashiki (JP); Hideki Maki, Kurashiki (JP); Keishi Hachiya, Kurashiki (JP); Masako Kawagoe, Kurashiki (JP); Yoko Mori, Osaka (JP)

(73) Assignee: KURARAY CO., LTD., Kurashiki-shi (JP)

( * ) Notice: Subject to any disclaimer, the term of this patent is extended or adjusted under 35 U.S.C. 154(b) by 0 days.

(21) Appl. No.: 15/021,305

(22) PCT Filed: Sep. 11, 2014

(86) PCT No.: PCT/JP2014/074147
§ 371 (c)(1),
(2) Date: Mar. 11, 2016

(87) PCT Pub. No.: WO2015/037683
PCT Pub. Date: Mar. 19, 2015

(65) Prior Publication Data
US 2016/0251466 A1 Sep. 1, 2016

(30) Foreign Application Priority Data

| Sep. 13, 2013 | (JP) | 2013-191179 |
| Feb. 28, 2014 | (JP) | 2014-039450 |
| Mar. 14, 2014 | (JP) | 2014-052636 |
| Mar. 31, 2014 | (JP) | 2014-073673 |
| Jul. 22, 2014 | (JP) | 2014-149240 |

(51) Int. Cl.
| C08L 29/04 | (2006.01) |
| C08F 216/06 | (2006.01) |
| B41M 5/337 | (2006.01) |
| C08F 16/00 | (2006.01) |
| C08F 8/12 | (2006.01) |
| C09D 129/04 | (2006.01) |
| D06M 15/333 | (2006.01) |
| D21H 19/20 | (2006.01) |
| B65D 65/42 | (2006.01) |
| D21H 27/00 | (2006.01) |
| D21H 27/10 | (2006.01) |
| D21H 17/36 | (2006.01) |
| D21H 19/60 | (2006.01) |
| D21H 21/16 | (2006.01) |
| B41M 5/52 | (2006.01) |

(52) U.S. Cl.
CPC ......... *C08F 216/06* (2013.01); *B41M 5/337* (2013.01); *B41M 5/5254* (2013.01); *B65D 65/42* (2013.01); *C08F 8/12* (2013.01); *C08F 16/00* (2013.01); *C09D 129/04* (2013.01); *D06M 15/333* (2013.01); *D21H 17/36* (2013.01); *D21H 19/20* (2013.01); *D21H 19/60* (2013.01); *D21H 21/16* (2013.01); *D21H 27/001* (2013.01); *D21H 27/10* (2013.01); *B41M 2205/02* (2013.01); *B41M 2205/32* (2013.01)

(58) Field of Classification Search
CPC ..... C08F 216/06; C09D 129/04; D21H 19/20; D21H 27/001; D06M 15/333; B41M 5/5254; B41M 2205/02; B41M 2205/32
USPC ........................................................ 524/557
See application file for complete search history.

(56) References Cited

U.S. PATENT DOCUMENTS

| 5,362,515 A * | 11/1994 | Hayes | D06L 1/14 427/155 |
| 5,552,212 A * | 9/1996 | Knoerzer | B32B 7/12 428/213 |
| 7,070,731 B2 * | 7/2006 | Kato | C08F 2/20 264/349 |
| 2004/0009357 A1 | 1/2004 | Kusudou et al. | |
| 2007/0208188 A1 | 9/2007 | Pinschmidt, Jr. et al. | |

(Continued)

FOREIGN PATENT DOCUMENTS

| CN | 1506383 A | 6/2004 |
| JP | 55-47256 A | 4/1980 |

(Continued)

OTHER PUBLICATIONS

Translation of JP07-228625, Aug. 29, 1995.*
Abstract of JP11-323781, Nov. 26, 1999.*
International Search Report issued Oct. 7, 2014 in PCT/JP2014/074147 (with English language translation).
Extended European Search Report issued Apr. 12, 2017 in Patent Application No. 14843527.4.

*Primary Examiner* — Hui Chin
(74) *Attorney, Agent, or Firm* — Oblon, McClelland, Maier & Neustadt, L.L.P.

(57) ABSTRACT

Provided by the present invention is a PVA having highly harmonized adequate water solubility, thickening property and coating film strength, and having superior storage stability in terms of the viscosity in an aqueous solution. A vinyl alcohol polymer having a ratio (Mw (A)/Mn (A)) of the weight average molecular weight (Mw (A)) to the number average molecular weight (Mn (A)) of 3 or greater and 8 or less, and being capable of giving a vinyl alcohol polymer having a ratio (Mw/Mn) of a weight average molecular weight (Mw) to a number average molecular weight (Mn) of 2 or greater and less than 3 when treated at 40° C. for 1 hour in a sodium hydroxide solution.

18 Claims, No Drawings

(56) References Cited

U.S. PATENT DOCUMENTS

| | | | |
|---|---|---|---|
| 2011/0201737 A1 | 8/2011 | Kato et al. | |
| 2013/0158222 A1 | 6/2013 | Hata et al. | |

FOREIGN PATENT DOCUMENTS

| | | | |
|---|---|---|---|
| JP | 56-82808 A | | 7/1981 |
| JP | 7-228625 A | | 8/1995 |
| JP | 07228625 | * | 8/1995 |
| JP | 8-3221 A | | 1/1996 |
| JP | 8-208724 A | | 8/1996 |
| JP | 8-259659 A | | 10/1996 |
| JP | 9-31849 A | | 2/1997 |
| JP | 10-338714 A | | 12/1998 |
| JP | 11323781 | * | 11/1999 |
| JP | 2003-171423 A | | 6/2003 |
| JP | 2003-238606 A | | 8/2003 |
| JP | 2004-91774 A | | 3/2004 |
| JP | 2005-281680 A | | 10/2005 |
| JP | 2006-152206 A | | 6/2006 |
| JP | 2007-23148 A | | 2/2007 |
| JP | 2007-63369 A | | 3/2007 |
| JP | 2008-143961 A | | 6/2008 |
| JP | 2008-291120 A | | 12/2008 |
| JP | 2009-108218 A | | 5/2009 |
| WO | WO 95/23254 A1 | | 8/1995 |

* cited by examiner

VINYL ALCOHOL POLYMER, THICKENING AGENT, STABILIZER FOR EMULSION POLYMERIZATION, STABILIZER FOR SUSPENSION POLYMERIZATION, COATING AGENT, COATED ARTICLE, SIZING AGENT FOR FIBERS, SIZED YARN, AND PRODUCTION METHOD OF TEXTILE

TECHNICAL FIELD

The present invention relates to a vinyl alcohol polymer, a thickening agent, a stabilizer for emulsion polymerization, a stabilizer for suspension polymerization, a coating agent, a coated article, a sizing agent for fibers, a sized yarn and a production method of a textile.

Vinyl Alcohol polymers (hereinafter, may be also abbreviated as "PVAs") are rare crystalline water soluble polymers and include a hydrophobic group and a hydrophilic group, thereby exhibiting a superior surface activity. In addition, PVAs can be stored for a long period of time without decomposition, and can form a coating film that is superior in strength. Thus, PVAs have been extensively used as a raw material of thickening agents, stabilizers for emulsion polymerization, stabilizers for suspension polymerization, coating agents for paper, adhesives, sizing agents for reinforcing textile warp yarns, binders, films and fibers, and the like.

For example, in a case where the PVA is used as a thickening agent, an alkyl-modified PVA having an alkyl group introduced thereinto exerts a superior thickening property due to a hydrophobic group interaction of the alkyl group in a water-based solvent (Patent Document 1, Patent Document 2 and see Patent Document 3). However, the alkyl-modified PVA is disadvantageous in that water solubility is insufficient.

Furthermore, when PVA is used as, for example, a stabilizer for emulsion polymerization, superior dispersion stability, as generally referred to, is required to inhibit aggregation of the aqueous emulsion during the emulsion polymerization. In addition, when the aqueous emulsion is used as an adhesive, the aqueous emulsion obtained by using the stabilizer for emulsion polymerization is required to be highly viscous. Moreover, when the aqueous emulsion is used for a binder, a paint, etc., a coating film formed from the aqueous emulsion is required to have superior strength. In order to meet the foregoing demands, techniques have been developed in which a modified PVA prepared through copolymerization of ethylene, a modified PVA having a functional group such as a silyl group introduced thereinto, or the like is used as a protective colloid for emulsion polymerization (see Patent Documents 4 and 5). However, the conventional stabilizer for emulsion polymerization fails to have inadequate water solubility and thickening property, leading to an inconvenience that the dispersibility during the emulsion polymerization, and viscosity of the aqueous emulsion may be insufficient.

Still further, when the PVA is used as, for example, a stabilizer for suspension polymerization, the resulting vinyl polymer in a powder form is expected to have a great bulk density in light of space saving during storage, improvement of transportation efficiency, improvement of the throughput in extrusion molding, and the like. In view of such expectations, a technique in which one or two or more types of PVAs and hydroxypropyl methyl cellulose are used in combination (see Patent Document 6 and Patent Document 7), a technique in which a modified PVA having an unsaturated double bond is used (see Patent Document 8 and Patent Document 9), and the like were developed. However, since the conventional stabilizers for suspension polymerization have inadequate water solubility and thickening property, variation in distribution of particle grades of the vinyl polymer particles occurs, accompanied by unsatisfactory bulk density of the vinyl polymer. Furthermore, they are also disadvantageous in that a large quantity of the PVA remains in wastewater after completion of the suspension polymerization to give the vinyl polymer, leading to an increase in cost of the wastewater treatment.

Moreover, in a case where the PVA is used, for example, as a coating agent, a method in which boric acid or the like is added to the PVA such that crosslinking is permitted in order to enhance the strength of the coating film formed from the coating agent has been employed. However, for the reasons of toxicity of boron, and the like, the amount of boric acid, etc., used has begun to be restricted in recent years. Thus, an alkyl-modified PVA having a hydrophobic group such as an alkyl group introduced thereinto was developed (see Patent Documents 10 and 11). Although these alkyl-modified PVAs are superior in thickening property, an inconvenience of unsatisfactory storage stability in terms of the viscosity that the viscosity decreases while the aqueous solution is stored for a long period of time has been found. Also, the strength of the coating film formed from these alkyl-modified PVAs is insufficient.

Moreover, in a case where the PVA is used as, for example, a sizing agent for fibers, when the sized yarns are divided into each yarn after a sizing agent for fibers is applied to a raw yarn bundle and dried, too great coating film strength may result in thread breakage, whereas too low coating film strength may result in low strength of the sized yarn, and the like, leading to deteriorated weaving performances. In addition, when the coating film strength is too low, sizing drop, i.e., detachment of a hardened sizing agent for fibers from the sized yarn, tends to increase during the dividing of the sized yarn. Furthermore, in the case where the sizing agent for fibers containing the PVA is used, an inconvenience of inferior desizing property after weaving of the sized yarn occurs since the water solubility is insufficient. In view of such inconveniences, sizing agents for fibers each containing any of various types of modified PVAs were developed. Examples of such sizing agents for fibers include sizing agent for fibers containing an ethylene modified PVA and starch as base materials (see Patent Document 12), a sizing agent for fibers containing a carboxyl-modified PVA such as alkyl acrylate (see Patent Document 13), and the like. However, these sizing agents for fibers do not sufficiently satisfy the weaving performance of the sized yarn, as well as the desizing property, and acceptable sizing drop in dividing, all together.

Therefore, the PVA for use in a thickening agent, a stabilizer for emulsion polymerization, a stabilizer for suspension polymerization, a coating agent and a sizing agent for fibers is desired to have adequate water solubility, thickening property and coating film strength, and to have superior storage stability in terms of the viscosity in an aqueous solution.

PRIOR ART DOCUMENTS

Patent Documents

Patent Document 1: Japanese Unexamined Patent Application, Publication No. S55-47256
Patent Document 2: Japanese Unexamined Patent Application, Publication No. 2008-291120

Patent Document 3: Japanese Unexamined Patent Application, Publication No. H10-338714
Patent Document 4: Japanese Unexamined Patent Application, Publication No. H08-259659
Patent Document 5: Japanese Unexamined Patent Application, Publication No. 2007-23148
Patent Document 6: Japanese Unexamined Patent Application, Publication No. 2003-238606
Patent Document 7: Japanese Unexamined Patent Application, Publication No. 2005-281680
Patent Document 8: Japanese Unexamined Patent Application, Publication No. 2007-63369
Patent Document 9: Japanese Unexamined Patent Application, Publication No. 2009-108218
Patent Document 10: Japanese Unexamined Patent Application, Publication No. 2008-291120
Patent Document 11: Japanese Unexamined Patent Application, Publication No. H10-338714
Patent Document 12: Japanese Unexamined Patent Application, Publication No. H9-31849
Patent Document 13: WO95/23254

SUMMARY OF THE INVENTION

Problems to be Solved by the Invention

The present invention was made in view of the foregoing circumstances, and an objective of the invention is to provide a PVA having highly harmonized water solubility, thickening property and coating film strength, and having superior storage stability in terms of the viscosity in an aqueous solution.

Means for Solving the Problems

According to an aspect of the invention made for solving the aforementioned problems, a vinyl alcohol polymer (hereinafter, may be also referred to as "PVA (A)") is provided having a ratio (Mw/Mn) of the weight average molecular weight (Mw) to the number average molecular weight (Mn) being 3 or greater and 8 or less, and being capable of giving a vinyl alcohol polymer (hereinafter, may be also referred to as "PVA (B)") having a ratio (Mw/Mn) of the weight average molecular weight (Mw) to the number average molecular weight (Mn) being 2 or greater and less than 3 when treated at 40° C. for 1 hour in a sodium hydroxide solution.

When the ratio (Mw/Mn) in the vinyl alcohol polymer (PVA (A)), and the ratio (Mw/Mn) in the vinyl alcohol polymer (PVA (B)) obtained by subjecting the vinyl alcohol polymer (PVA (A)) to an alkaline treatment under a specific condition each fall within the above range, the vinyl alcohol polymer is believed to have the water solubility, the thickening property and the coating film strength all together improved in a well-harmonized manner, and to have superior storage stability in terms of the viscosity.

The vinyl alcohol polymer (PVA (A)) is preferably obtained by: polymerizing a vinyl ester monomer in the presence of at least one monomer (hereinafter, may be also referred to as "monomer (a)") selected from the group consisting of a carboxylic acid having an unsaturated double bond, an alkyl ester thereof, an acid anhydride thereof and a salt thereof, and a silyl compound having an unsaturated double bond; and thereafter saponifying and carrying out a heat treatment of the polymerization product. When the vinyl alcohol polymer (PVA (A)) is obtained by using a vinyl ester polymer obtained through polymerizing the vinyl ester monomer in the presence of the monomer (a), the vinyl alcohol polymer (PVA (A)) has a hydrophilic carboxyl group or silyl group derived from the monomer (a), and thus it is believed that the water solubility of the vinyl alcohol polymer (PVA (A)) can be more adequately regulated. In addition, since the heat treatment forms an ester bond between the hydroxyl group and the carboxyl group, whereby a branched structure can be entirely formed, it is believed that the thickening property of the vinyl alcohol polymer, and the strength of the coating film can be more appropriately adjusted.

According to another aspect of the invention made for solving the aforementioned problems, a thickening agent containing the vinyl alcohol polymer (PVA (A)) is provided. Due to containing the vinyl alcohol polymer (PVA (A)), the thickening agent can be excellent in water solubility, and can exhibit a superior thickening property.

In addition, the hydrophilic carboxyl group or the silyl group serves in further improving the water solubility of the thickening agent. Moreover, the branched structure is believed to further improve the thickening property of the thickening agent.

According to still another aspect of the invention made for solving the aforementioned problems, a stabilizer for emulsion polymerization containing the vinyl alcohol polymer (PVA (A)) is provided. Due to containing the vinyl alcohol polymer (PVA (A)), the stabilizer for emulsion polymerization exhibits superior dispersibility in the emulsion polymerization and enables a highly viscous aqueous emulsion to be obtained, and further the coating film formed from the aqueous emulsion is superior in the strength.

Additionally, it is believed that the hydrophilic carboxyl group or silyl group would further improve the hydrophilicity of the stabilizer for emulsion polymerization. Furthermore, due to the branched structure, the stabilizer for emulsion polymerization can exhibit superior dispersibility in emulsion polymerization, and it is believed that the viscosity of the resulting aqueous emulsion as well as the strength of the coating film formed from the aqueous emulsion are further improved.

In addition, it is preferred that the stabilizer for emulsion polymerization further contains water. When water is thus contained, the vinyl alcohol polymer is dispersed or dissolved in water, and as a result, the stabilizer for emulsion polymerization enables the emulsion polymerization of a vinyl ester monomer to be more easily and certainly carried out.

According to yet another aspect of the invention made for solving the aforementioned problems, a stabilizer for suspension polymerization containing the vinyl alcohol polymer (PVA (A)) is provided. Due to containing the vinyl alcohol polymer (PVA (A)), the stabilizer for suspension polymerization leads to polymerization stability during the suspension polymerization and enables a vinyl polymer having a high bulk density to be obtained, and the amount of a remaining vinyl alcohol polymer in wastewater after the polymerization can be decreased.

Additionally, it is believed that the hydrophilic carboxyl group or the silyl group would further improve the hydrophilicity of the stabilizer for suspension polymerization, and would enable a vinyl polymer being more superior in polymerization stability during the suspension polymerization, and having a high bulk density to be obtained. Furthermore, due to the branched structure, the bulk density of the vinyl polymer obtained by using the stabilizer for suspension polymerization is further improved, and it is believed that the amount of a remaining vinyl alcohol polymer in the wastewater after the polymerization can be further decreased.

In addition, it is preferred that the stabilizer for suspension polymerization further contains water. When water is thus contained, the vinyl alcohol polymer is dispersed or dissolved in water, and as a result, the stabilizer for suspension polymerization enables the polymerization of the vinyl monomer to be more easily and certainly carried out.

According to the other aspect of the invention made for solving the aforementioned problems, a coating agent containing the vinyl alcohol polymer (PVA (A)) is provided. Due to containing the vinyl alcohol polymer (PVA (A)), the coating agent is superior in storage stability of the aqueous solution, and can form a coating film having superior strength. In addition, the coating film has superior oil resistance, water resistance and printability.

In addition, due to the hydrophilic carboxyl group or the silyl group, the coating agent is believed to be more superior in the storage stability of the aqueous solution. Furthermore, due to the branched structure, the coating agent can be more superior in the storage stability of the aqueous solution, and therefore it is believed that a coating film having further superior strength can be formed. Additionally, the coating film has more superior oil resistance, water resistance and printability.

According to still other invention made for solving the aforementioned problems, a coated article produced by applying the coating agent onto the surface of a base material is provided. Accordingly, due to the coating agent applied on the surface of the base material, the coating film of the coated article has superior strength. In addition, the coating film has oil resistance, water resistance and printability. Therefore, the coated article can be suitably used for an thermal recording paper, a base paper for release paper, an oil resistant paper, and the like.

According to still other aspect of the invention made for solving the aforementioned problems, a sizing agent for fibers containing the vinyl alcohol polymer (PVA (A)) is provided. Due to containing the vinyl alcohol polymer (PVA (A)), the sizing agent for fibers reduces a sizing drop in dividing sized yarns obtained by using the sizing agent for fibers, leading to superior weaving performance and desizing property.

Additionally, it is believed that the hydrophilic carboxyl group or silyl group would further improve the hydrophilicity of the sizing agent for fibers, and as a result, a desizing property after weaving of the sized yarn obtained by using the sizing agent for fibers would be further improved. Furthermore, due to the branched structure, the sizing drop in dividing the sized yarns is further reduced, and thus it is believed that a sizing agent for fibers can be obtained which gives the sized yarns being more superior in the weaving performance and a desizing property.

It is preferred that the sizing agent for fibers further contains a wax. When a wax is thus contained, the sizing drop in dividing the sized yarns obtained by using the sizing agent for fibers is further reduced, leading to a further improved weaving performance.

According to yet other invention made for solving the aforementioned problems, a sized yarn includes a raw yarn, and a binder with which the raw yarn is impregnated, in which the binder is formed from the sizing agent for fibers. Due to containing the sizing agent for fibers, the sized yarn is accompanied by less sizing drop in the division, leading to a superior weaving performance and desizing property.

Moreover, according to still further aspect of the invention made for solving the aforementioned problems, a production method of a textile, which includes a step of weaving the sized yarn is provided. According to the production method of a textile, use of the sized yarn enables a sizing drop in dividing the sized yarns to be reduced, with superior weaving performance and desizing property, and as a result, the textile can be conveniently provided.

Effects of the Invention

The vinyl alcohol polymer (PVA (A)) of the aspect of the present invention has water solubility and a thickening property in a well-balanced manner, and additionally, leads to superior strength of the dry coating film. Therefore, the vinyl alcohol polymer can be suitably used for thickening agents for use in water-based solutions and water-based emulsion solutions such as paints, cements, concretes, adhesives, binders and cosmetics, as well as stabilizers for emulsion polymerization, stabilizers for suspension polymerization, coating agents and sizing agents for fibers.

DESCRIPTION OF EMBODIMENTS

PVA (A)

The vinyl alcohol polymer (A) (hereinafter, the vinyl alcohol polymer may be abbreviated as "PVA") includes a vinyl alcohol unit. In addition, the thickening agent, the stabilizer for emulsion polymerization, the stabilizer for suspension polymerization, the coating agent and the sizing agent for fibers of the aspects of the present invention each contain the PVA (A).

The PVA (A) has a ratio (Mw (A)/Mn (A)) of the weight average molecular weight (Mw (A)) to the number average molecular weight (Mn (A)) being 3 or greater and 8 or less. The lower limit of the ratio is preferably 3.2, more preferably 3.4, and still more preferably 3.6, whereas the upper limit of the ratio is preferably 6, and more preferably 5.

The PVA (B) is obtained by subjecting the PVA (A) to a treatment at 40° C. for 1 hour in a sodium hydroxide solution. As this treatment, a method of complete saponification described in the section of "average degree of polymerization" in JIS-K6726: 1994 may be employed, and specifically, the PVA (B) may be obtained as in the following. More specifically, the PVA (B) may be obtained by a method including: weighing about 10 g of the PVA (A) into a 500 mL ground-glass Erlenmeyer flask; adding 200 mL of methanol thereto; thereafter, adding a 12.5 mol/L sodium hydroxide solution in an amount of 3 mL in the case in which the PVA (A) has a degree of saponification of 97 mol % or greater, or 10 mL in the case in which the PVA (A) has a degree of saponification of less than 97 mol %; then stirring the mixture; after heating in a water bath at 40° C. for 1 hour, adding phenolphthalein as an indicator; washing with methanol until the alkaline reaction is not found to remove sodium hydroxide; then transferring the material onto a watch glass; and drying at 105° C. for 1 hour until methanol is evaporated off.

The PVA (B) has a ratio (Mw (B)/Mn (B)) of the weight average molecular weight (Mw (B)) to the number average molecular weight (Mn (B)) being 2 or greater and less than 3. The lower limit of the ratio is preferably 2.1, and more preferably 2.2, whereas the upper limit of the ratio is preferably 2.9, and more preferably 2.8.

In regard to the PVA (A) according to the embodiment of the present invention, due to the (Mw (A)/Mn (A)) and the (Mw (B)/Mn (B)) falling within the above range, it is believed that the PVA (A) forms a branched structure by binding, which is cleaved under an alkaline condition, of PVA chains each other. Further, due to the branched structure, the strength of the coating film formed from the PVA (A) is improved, and it is believed that the thickening property of the thickening agent containing the PVA (A), the dispersibility during the emulsion polymerization of the stabilizer for emulsion polymerization containing the PVA (A), the polymerization stability during the suspension polymerization carried out using the stabilizer for suspension polymerization containing the PVA (A), the strength, oil resistance, water resistance and printability of the coating film formed from the coating agent containing the PVA (A), as well as possible reduction of the sizing drop in the dividing, and weaving performance and desizing property of the sized yarns produced obtained by using the sizing agent for fibers containing the PVA (A) are improved.

The method for forming the branched structure of the PVA (A) is not particularly limited. For example, a method in which the PVA after saponification is subjected to a heat treatment in a nitrogen or air atmosphere, a method in which the PVA after the saponification is subjected to an acid treatment, and the like may be involved.

Examples of an acidic substance which can be used in the method in which the PVA after the saponification is subjected to an acid treatment include: inorganic acids such as hydrochloric acid, sulfuric acid, nitric acid and phosphoric acid; organic acids such as formic acid, acetic acid, oxalic acid and p-toluenesulfonic acid; salts such as pyridinium p-toluenesulfonate and ammonium chloride; Lewis acids such as zinc chloride, aluminum chloride, iron trichloride, tin dichloride, tin trichloride and a boron trifluoride diethyl ether complex; and the like. Either one, or two or more types of these in combination may be used. In general, the amount of these acidic substances blended with respect to 100 parts by mass of the PVA after the saponification is preferably 0.0001 parts by mass to 5 parts by mass.

It is to be noted that the number average molecular weight (Mn) and the weight average molecular weight (Mw) of the PVA (A) and PVA (B) may be determined in terms of a polymethyl methacrylate equivalent value by a gel permeation chromatography (GPC) measurement using hexafluoroisopropanol as a mobile phase, with a differential refractive index detector. In a more specific method, the followings may be employed.

GPC column: Tosoh Corporation, "$GMH_{HR}$ (S)"×2
mobile phase: hexafluoroisopropanol
flow rate: 0.2 mL/min
sample concentration: 0.100 wt/vol %
amount of injected sample: 10 μL
detector: differential refractive index detector
standard substance: polymethyl methacrylate (for example, Agilent Technologies, "EasiVial PMMA 4 mL tri-pack")

To hexafluoroisopropanol for use as a mobile phase, it is preferred that a salt such as sodium trifluoroacetate is added in order to inhibit adsorption of the sample to the GPC column filler. The lower limit of the concentration of the salt is preferably 1 mmol/L, and more preferably 5 mmol/L. On the other hand, the upper limit of the concentration of the salt is preferably 100 mmol/L, and more preferably 50 mmol/L.

The ratio (Mw (A)/Mw (B)) of the weight average molecular weight (Mw (A)) of the PVA (A) to the weight average molecular weight (Mw (B)) of the PVA (B) is not particularly limited, and the lower limit is preferably 1.4, and more preferably 1.5. On the other hand, the upper limit of the ratio (Mw (A)/Mw (B)) is preferably 3.0, and more preferably 2.5.

When the ratio (Mw (A)/Mw (B)) is greater than the lower limit, the thickening property of the thickening agent containing the PVA (A), the viscosity of the aqueous emulsion obtained by using the stabilizer for emulsion polymerization containing the PVA (A), the polymerization stability during the suspension polymerization carried out using the stabilizer for suspension polymerization containing the PVA (A), and the strength, oil resistance, water resistance and printability of the coating film formed from the coating agent containing the PVA (A) are improved.

On the other hand, when the ratio (Mw (A)/Mw (B)) is less than the upper limit, the water solubility of the thickening agent containing the PVA (A), the dispersibility during the emulsion polymerization of the stabilizer for emulsion polymerization containing the PVA (A), the bulk density of the vinyl polymer obtained by using the stabilizer for suspension polymerization containing the PVA (A), the decreasing property of the remaining amount of the PVA in the polymerization wastewater generated after the suspension polymerization, and the storage stability of the coating agent containing the PVA (A) are further improved.

In addition, when the ratio (Mw (A)/Mw (B)) is less than the lower limit, the sizing drop in dividing the sized yarns obtained by using the sizing agent for fibers may be increased. On the other hand, when the ratio (Mw (A)/Mw (B)) is greater than the upper limit, the weaving performance of the sized yarn obtained by using the sizing agent for fibers may be deteriorated.

As the PVA (A), a product obtained from a vinyl ester polymer by saponification may be used. The PVA (A) may have only the vinyl alcohol unit, and preferably further have a unit derived from the monomer (a).

The vinyl ester monomer for use in the production of the vinyl ester polymer is not particularly limited, and for example, vinyl formate, vinyl acetate, vinyl propionate, vinyl butyrate, vinyl isobutyrate, vinyl pivalate, vinyl versatate, vinyl caprate, vinyl caprylate, vinyl laurate, vinyl palmitate, vinyl stearate, vinyl oleate, vinyl benzoate and the like are exemplified. Of these, in light of economical aspects, vinyl acetate is preferred.

The monomer (a) is at least one monomer selected from the group consisting of a carboxylic acid having an unsaturated double bond, an alkyl ester of the carboxylic acid, an acid anhydride of the carboxylic acid, a salt of the carboxylic acid, and a silyl compound having an unsaturated double bond.

Examples of the carboxylic acid having an unsaturated double bond, the alkyl ester of the carboxylic acid, the acid anhydride of the carboxylic acid and the salt of the carboxylic acid include maleic acid, maleic acid monomethyl ester, maleic acid dimethyl ester, maleic acid monoethyl ester, maleic acid diethyl ester, maleic anhydride, citraconic acid, citraconic acid monomethyl ester, citraconic acid dimethyl ester, citraconic acid diethyl ester, citraconic anhydride, fumaric acid, fumaric acid monomethyl ester, fumaric acid dimethyl ester, fumaric acid monoethyl ester, fumaric acid diethyl ester, itaconic acid, itaconic acid monomethyl ester, itaconic acid dimethyl ester, itaconic acid monoethyl ester, itaconic acid diethyl ester, itaconic anhydride, acrylic acid, methyl acrylate, ethyl acrylate, methacrylic acid, methyl methacrylate, ethyl methacrylate, and the like.

Examples of the silyl compound having an unsaturated double bond include compounds having an unsaturated double bond and a trialkoxysilyl group such as vinyltrimethoxysilane and vinyltriethoxysilane, and the like.

Of these monomers (a), maleic acid monomethyl ester, citraconic acid monomethyl ester, itaconic acid monomethyl ester, methyl acrylate, methyl methacrylate and vinyltrimethoxysilane are preferred, and maleic acid monomethyl ester, methyl acrylate, methyl methacrylate, and vinyltrimethoxysilane are more preferred.

The lower limit of the degree of modification of the unit derived from the monomer (a) in the PVA (A) is, based on the number of moles of all the monomer units constituting the PVA (A), preferably 0.02 mol %, more preferably 0.05 mol %, and still more preferably 0.1 mol %. On the other hand, the upper limit of the degree of modification of the unit derived from the monomer (a) in the PVA (A) is, based on the number of moles of all the monomer units constituting the PVA (A), preferably 5 mol %, more preferably 2 mol %, and still more preferably 1 mol %.

When the degree of modification of the unit derived from the monomer (a) is greater than the lower limit, the thickening property of the thickening agent containing the PVA (A), the viscosity of the aqueous emulsion obtained by using the stabilizer for emulsion polymerization containing the PVA (A), and the strength of the coating film formed from the aqueous emulsion, the polymerization stability during the suspension polymerization carried out using the stabilizer for suspension polymerization containing the PVA (A), as well as the strength, oil resistance, water resistance and printability of the coating film formed from the coating agent containing the PVA (A) are further improved.

On the other hand, when the degree of modification of the unit derived from the monomer (a) is less than the upper limit, the water solubility of the thickening agent containing the PVA (A), the dispersibility during the emulsion polymerization of the stabilizer for emulsion polymerization containing the PVA (A), the bulk density of the vinyl polymer obtained by using the stabilizer for suspension polymerization containing the PVA (A), the effect of decreasing the remaining amount of the PVA in the polymerization wastewater after the suspension polymerization, and the storage stability of the coating agent are further improved.

Also, when the degree of modification is less than the lower limit, the weaving performance of the sized yarn obtained by using the sizing agent for fibers may be deteriorated. To the contrary, when the degree of modification is greater than the upper limit, the desizing property of the sized yarn obtained by using the sizing agent for fibers may be deteriorated.

The PVA (A) may have a unit derived from other monomer except for the vinyl alcohol unit and the unit derived from the monomer (a) within a range not leading to impairment of principles of the present invention. Examples of the unit derived from the other monomer include units derived from: α-olefins such as ethylene, propylene, n-butene and isobutylene; vinyl ethers such as methyl vinyl ether, ethyl vinyl ether, n-propyl vinyl ether, i-propyl vinyl ether, n-butyl vinyl ether, i-butyl vinyl ether, t-butyl vinyl ether and 2,3-diacetoxy-1-vinyloxypropane; vinyl cyanides such as acrylonitrile and methacrylonitrile; halogenated vinyls such as vinyl chloride and vinyl fluoride; halogenated vinylidenes such as vinylidene chloride and vinylidene fluoride; allyl compounds such as allyl acetate, 2,3-diacetoxy-1-allyloxypropane and allyl chloride; isopropenyl acetate; and the like. The degree of modification of the unit derived from the other monomer in the PVA (A) may be, based on the number of moles of all the monomer units constituting the PVA (A), for example, 15 mol % or less.

The arrangement sequence of the vinyl alcohol unit, the unit derived from the monomer (a) and the unit derived from the other monomer in the PVA (A) is not particularly limited, and may be any one of random, block, and alternate sequences.

The primary structure of the PVA (A) may be quantitatively determined by $^1$H-NMR.

The degree of saponification of the PVA (A) (i.e., a molar fraction of hydroxyl groups with respect to the sum of the hydroxyl groups and ester bonds in the PVA (A)) may be measured in accordance with JIS-K6726: 1994. The lower limit of the degree of saponification is preferably 20 mol %, more preferably 60 mol %, still more preferably 70 mol %, particularly preferably 80 mol %, and most preferably 87 mol %.

When the degree of saponification of the PVA (A) is equal to or greater than the lower limit, the thickening property and water solubility of the thickening agent containing the PVA (A), the dispersibility during the emulsion polymerization of the stabilizer for emulsion polymerization containing the PVA (A), the viscosity of the aqueous emulsion obtained by using the stabilizer for emulsion polymerization and the strength of the coating film formed from the aqueous emulsion, the polymerization stability during the suspension polymerization carried out using the stabilizer for suspension polymerization containing the PVA (A) and the bulk density of the resultant vinyl polymer, the effect of decreasing the remaining amount of the PVA in the polymerization wastewater after the suspension polymerization, the storage stability of the coating agent containing the PVA (A), the strength, oil resistance, water resistance and printability of the coating film formed from the coating agent, and the desizing property of the sized yarn obtained by using the sizing agent for fibers containing the PVA (A) are further improved.

The determination of the viscosity average degree of polymerization (P) of the PVA (A) may include: completely saponifying the PVA (A); purifying the product; and then measuring the limiting viscosity [η] (unit: L/g) in an aqueous sodium chloride solution (0.5 mol/L) at 30° C. for the PVA (A) having the unit derived from the monomer (a), or measuring the limiting viscosity [η] (unit: L/g) in an aqueous solution at 30° C. for the PVA (A) not having the unit derived from the monomer (a). The viscosity average degree of polymerization (P) of the PVA (A) is determined from the limiting viscosity [η] according to the following formula:

$$P=([\eta]\times 10^4/8.29)^{(1/0.62)}.$$

The upper limit of the viscosity average degree of polymerization of the PVA (A) is preferably 5,000, and more preferably 4,000. On the other hand, the lower limit of the viscosity average degree of polymerization of the PVA (A) is preferably 100, more preferably 500, and still more preferably 1,000. When the viscosity average degree of polymerization of the PVA (A) is equal to or greater than the lower limit, the thickening property of the thickening agent containing the PVA (A), the viscosity of the aqueous emulsion obtained by using the stabilizer for emulsion polymerization containing the PVA (A) and the strength of the coating film formed from the aqueous emulsion, the polymerization stability during the suspension polymerization carried out using the stabilizer for suspension polymerization containing the PVA (A), the strength, oil resistance, water resistance and printability of the coating film formed from the coating agent containing the PVA (A), and the weaving performance of the sized yarn obtained by using the sizing agent for fibers containing the PVA (A) are further improved. On the other hand, when the viscosity average degree of polymerization of the PVA (A) is equal to or less than the upper limit, productivity of the PVA (A) is improved, and therefore production of the PVA (A) at a lower cost is enabled.

In addition, since the PVA (B) is obtained by subjecting the PVA (A) to a treatment in a sodium hydroxide solution at 40° C. for 1 hour, the viscosity average degree of polymerization of the PVA (B) becomes a substantially identical value to the viscosity average degree of polymerization of the PVA (A).

Production of PVA (A)

The steps for producing the PVA (A) include, for example: a step of polymerizing a monomer including a vinyl ester monomer (hereinafter, may be also referred to as "polymerization step"); and a step of saponifying a vinyl ester polymer obtained in the polymerization step (hereinafter, may be also referred to as "saponification step"). In addition, it is preferred that a step of heating the vinyl ester polymer or the PVA after the saponification (hereinafter, may be also referred to as "heating step") is further included.

Polymerization Step

In this step, the monomer including the vinyl ester monomer is polymerized to synthesize the vinyl ester polymer. The monomer including the vinyl ester monomer may either include only the vinyl ester monomer, or include the vinyl ester monomer, and the monomer (a) and/or the other monomer as described above.

The method of the polymerization of the monomer including the vinyl ester monomer may be any one of batch polymerization, semi-batch polymerization, continuous polymerization, and semi-continuous polymerization. As the polymerization procedure, a well-known arbitrary procedure such as a bulk polymerization procedure, a solution polymerization procedure, a suspension polymerization procedure and an emulsion polymerization procedure may be adopted. Of these, the bulk polymerization procedure, or the solution polymerization procedure in which the polymerization is carried out in the absence of a solvent or in a solvent such as an alcohol, may be usually adopted. In order to obtain a vinyl ester polymer having a high degree of polymerization, the emulsion polymerization procedure may be adopted as one candidate. The solvent for the solution polymerization procedure is not particularly limited, and for example, an alcohol and the like may be exemplified. The alcohol which may be used as the solvent in the solution polymerization procedure is exemplified by a lower alcohol such as methanol, ethanol and n-propanol. The solvent may be used alone of one type, or two or more types thereof may be used in combination. The amount of the solvent used in the polymerization system may be appropriately selected depending on an intended degree of polymerization of the PVA (A), and the like, taking into consideration chain transfer to the solvent. For example, when the solvent is methanol, the lower limit of the mass ratio, {=(solvent)/(total monomers)}, of the solvent to the total monomers included in the polymerization system is preferably 0.01, and more preferably 0.05. On the other hand, the upper limit of the mass ratio is preferably 10, and more preferably 3.

A polymerization initiator for use in such polymerization may be appropriately selected from among well-known polymerization initiators such as, e.g., an azo type initiator, a peroxide type initiator, a redox type initiator, and the like, depending on the polymerization procedure. Examples of the azo type initiator include 2,2'-azobisisobutyronitrile, 2,2'-azobis(2,4-dimethylvaleronitrile), 2,2'-azobis(4-methoxy-2,4-dimethylvaleronitrile), and the like. Examples of the peroxide type initiator include: percarbonate compounds such as diisopropyl peroxydicarbonate, di-2-ethylhexyl peroxydicarbonate and diethoxyethyl peroxydicarbonate; perester compounds such as t-butyl peroxyneodecanate, α-cumyl peroxyneodecanate and t-butyl peroxydecanate; acetyl peroxide; acetylcyclohexylsulfonyl peroxide; 2,4,4-trimethylpentyl 2-peroxyphenoxyacetate; and the like. The initiator may be used as a combined initiator with potassium persufate, ammonium persulfate, hydrogen peroxide or the like. Examples of the redox type initiator include combinations of the peroxide type initiator with a reducing agent such as sodium bisulfite, sodium bicarbonate, tartaric acid, L-ascorbic acid or Rongalit.

Although the amount of the polymerization initiator used cannot be generally predetermined since the amount may vary depending on the polymerization catalyst and the like, it may be appropriately selected depending on the polymerization rate. For example, when 2,2'-azobisisobutyronitrile or acetyl peroxide is used as the polymerization initiator, the lower limit of the amount of the polymerization initiator used with respect to the vinyl ester monomer is preferably 0.01 mol %, and more preferably 0.02 mol %. On the other hand, the upper limit of the content of the polymerization initiator is preferably 0.2 mol %, and more preferably 0.15 mol %.

The lower limit of the temperature in the polymerization step is preferably 0° C., and more preferably 30° C. The upper limit of the polymerization temperature is preferably 200° C., and more preferably 140° C. When the polymerization temperature is equal to or greater than the lower limit, the polymerization rate is improved. On the other hand, when the polymerization temperature is equal to or less than the upper limit, even in a case where the monomer (a) is used, for example, maintaining the degree of modification of the unit derived from the monomer (a) in the PVA (A) at an appropriate level may be facilitated. Exemplary procedure for adjusting the polymerization temperature so as to fall within the above range may include: a procedure in which the polymerization rate is regulated to make a balance between heat generated by the polymerization and heat radiation from the surface of the reactor; and a procedure of adjusting the polymerization temperature by an external jacket in which an appropriate heating medium is used; or the like, and in light of safety, the latter procedure is preferred.

The polymerization may be carried out in the presence of a chain transfer agent within the range not leading to impairment of the principles of the present invention. Examples of the chain transfer agent include: aldehydes such as acetaldehyde and propionaldehyde; ketones such as acetone and methyl ethyl ketone; mercaptans such as 2-hydroxyethanethiol; halogenated hydrocarbons such as trichloroethylene and perchloroethylene; phosphinic acid salts such as sodium phosphinate monohydrate; and the like. Of these, aldehydes and ketones are preferred. The amount of the chain transfer agent added to the polymerization system may be predetermined depending on the chain transfer coefficient of the chain transfer agent added, the intended degree of polymerization of the PVA (A), and the like. In general, the amount of the chain transfer agent with respect to 100 parts by mass of the vinyl ester monomer is preferably 0.1 parts by mass to 10 parts by mass.

It is to be noted that in a case where the polymerization is carried out at a high temperature, coloring, etc., of the PVA (A) resulting from degradation of the vinyl ester monomer may be found. In such an instance, an antioxidant such as tartaric acid may be added in an amount of about 1 ppm to 100 ppm with respect to the vinyl ester monomer to the polymerization system for the purpose of preventing the coloring.

Saponification Step

In this step, the vinyl ester polymer is saponified. The saponification of the polymer allows the vinyl ester unit in the polymer to be converted into the vinyl alcohol unit.

Although the reaction for the saponification of the vinyl ester polymer is not particularly limited, a well-known alcoholysis reaction or hydrolysis reaction carried out in a state in which the polymer is dissolved in a solvent may be adopted.

Examples of the solvent for use in the saponification include: lower alcohols such as methanol and ethanol; esters such as methyl acetate and ethyl acetate; ketones such as acetone and methyl ethyl ketone; aromatic hydrocarbons such as benzene and toluene; and the like. These solvents may be used alone of one type, or two or more types thereof may be used in combination. Of these, methanol, and a mixed solution of methanol and methyl acetate are preferred.

Examples of the catalyst for use in the saponification include: alkali catalysts such as alkali metal hydroxides (potassium hydroxide, sodium hydroxide, etc.) and sodium alkoxide (sodium methoxide, etc.); acid catalysts such as p-toluenesulfonic acid and mineral acid; and the like. Of these, sodium hydroxide is preferably used due to the convenience.

The temperature for carrying out the saponification is not particularly limited, but is preferably 20° C. to 60° C. In a case where gelatinous products are deposited as the saponification proceeds, the products may be ground, followed by further allowing the saponification to proceed. Thereafter, the resulting solution is neutralized to complete the saponification, and is washed and dried to obtain the PVA. The saponification process is not limited to the foregoings, and a well-known process may be employed.

Heating Step

In this step, the vinyl ester polymer or the PVA after the saponification is heated. Specifically, the vinyl ester polymer may be heated concurrently with the saponification step, or the PVA obtained may be heated after completing the saponification step. The heating enables PVA (A) having a branched structure formed therein to be easily obtained, and the thickening property of the thickening agent containing the PVA (A), the dispersibility during the emulsion polymerization of the stabilizer for emulsion polymerization containing the PVA (A), the viscosity of the aqueous emulsion obtained by the emulsion polymerization, and the strength of the coating film formed from the aqueous emulsion are further improved. Furthermore, the polymerization stability during the suspension polymerization carried out using the stabilizer for suspension polymerization containing the PVA (A) and the bulk density of the resultant vinyl polymer, and the effect of decreasing the remaining amount of the PVA in the polymerization wastewater after the suspension polymerization are improved. In addition, the storage stability of the coating agent containing the PVA (A), the strength of the coating film formed from the coating agent, oil resistance, water resistance and printability, and the weaving performance of the sized yarn obtained by using the sizing agent for fibers containing the PVA (A) and desizing property are further improved. The heat treatment is preferably carried out in an air or nitrogen atmosphere. In addition, the heating treatment is preferably executed to the PVA after the saponification.

The lower limit of the heating temperature in the heating step is preferably 70° C., and more preferably 90° C. The upper limit of the heating temperature is preferably 170° C., and more preferably 150° C. The lower limit of the heating time in the heating step is preferably 30 min, more preferably 1 hour, and still more preferably 2 hours. The upper limit of the heating time period is preferably 10 hours, more preferably 7 hours, and still more preferably 5 hours.

Thickening Agent

The thickening agent contains the PVA (A). Although the state of the thickening agent is not particularly limited, powders containing the PVA (A), liquids containing the PVA (A) and water or water-containing solvent, and the like may be exemplified. The liquid thickening agent is suitable for the case in which the agent is used for a water dispersible emulsion-containing matter such as paints and adhesives.

Although the solvent which is other than water and contained in the water-containing solvent is not particularly limited, examples thereof include: alcohol solvents such as methanol and ethanol; ester solvents such as methyl acetate and ethyl acetate; ether solvents such as diethyl ether, 1,4-dioxane, methylcellosolve, cellosolve, butylcellosolve, MTBE (methyl-t-butyl ether) and butylcarbitol; ketone solvents such as acetone and diethyl ketone; glycol solvents such as ethylene glycol, propylene glycol, diethylene glycol and triethylene glycol; glycol ether solvents such as diethylene glycol monomethyl ether, triethylene glycol monomethyl ether, propylene glycol monomethyl ether and 3-methoxy-3-methyl-1-butanol; glycol ester solvents such as ethylene glycol monomethyl ether acetate, PMA (propylene glycol monomethyl ether acetate), diethylene glycol monobutyl ether acetate and diethylene glycol monoethyl ether acetate; and the like.

When the thickening agent is a liquid, the lower limit of the content of the PVA (A) with respect to 100 parts by mass of the solvent is preferably 1 part by mass, and more preferably 3 parts by mass. The upper limit of the content of the PVA (A) is preferably 50 parts by mass, and more preferably 30 parts by mass. Such a liquid thickening agent is produced by heating and mixing water or a water-containing solvent with the PVA (A).

The liquid thickening agent may contain a plasticizer, a surfactant, a defoaming agent, an ultraviolet ray-absorbing agent and the like within a range not leading to impairment of the effects of the present invention.

In addition, the thickening agent may contain other water soluble polymers such as well-known various types of PVAs, starch, carboxymethyl cellulose, methyl cellulose, hydroxymethyl cellulose, hydroxyethyl cellulose and hydroxypropyl methyl cellulose, similarly within a range not leading to impairment of the effects of the present invention. The content of these other water soluble polymers is, with respect to 100 parts by mass of the PVA (A), preferably 50 parts by mass or less.

Production Method of Thickening Agent

Although the production method of a thickening agent is not particularly limited, for example, the method includes: a step of producing the PVA (A); and a step of mixing the PVA (A) and optional component(s).

Stabilizer for Emulsion Polymerization

The stabilizer for emulsion polymerization contains the PVA (A). In addition, the stabilizer preferably contains water, and may contain other component such as a surfactant other than the PVA (A) within a range not leading to impairment of the effects of the invention. By using the stabilizer for emulsion polymerization, an aqueous emulsion can be obtained from an ethylenic unsaturated monomer.

Due to containing water, the stabilizer for emulsion polymerization can be used in emulsion polymerization in a state in which the PVA (A) is dispersed or dissolved in water. As a result, the stabilizer for emulsion polymerization enables emulsion polymerization of the vinyl ester monomer to be more easily and certainly carried out. The upper limit of the content of water in the stabilizer for emulsion polymerization is preferably 99.5% by mass, and more preferably 99% by mass. On the other hand, the lower limit of the content of water is preferably 70% by mass, and more preferably 75% by mass. When the content of water is greater than the upper limit, the emulsion polymerization reaction may not be sufficiently caused. To the contrary, when the content of water is less than the lower limit, the dispersion or dissolution of the PVA (A) may be insufficient.

Examples of the solvent include: lower alcohols such as methanol and ethanol; esters such as methyl acetate and ethyl acetate; ketones such as acetone and methyl ethyl ketone; aromatic hydrocarbons such as benzene and toluene; and the like. These solvents may be used alone of one type, or two or more types thereof may be used in combination.

Examples of the surfactant include: anionic surfactants such as alkylnaphthalenesulfonic acid salts and dialkylsulfosuccinic acids; cationic surfactants such as alkylamine salts and lauryltrimethylammonium chloride; nonionic surfactants such as polyoxyethylene alkyl ethers, polyoxyethylene alkylphenyl ethers and sorbitan fatty acid esters; amphoteric surfactants such as alkylbetaine and amine oxide; macromolecular surfactants such as vinyl alcohol polymers other than the PVA (A) and hydroxyethyl cellulose; and the like.

Production Method of Stabilizer for Emulsion Polymerization

The production method of the stabilizer for emulsion polymerization is exemplified by a method including a step of appropriately mixing the PVA (A) obtained by the aforementioned production method, and optional component(s).

Aqueous Emulsion

The aqueous emulsion is suitably used for various types of adhesives, paints, fiber coating agents, paper coating agents, inorganic binders, cement admixtures, mortar primers, and the like. In an exemplary production method of the aqueous emulsion, an ethylenic unsaturated monomer is added once or continuously in the presence of a polymerization initiator in an aqueous solution of the stabilizer for emulsion polymerization to allow for the emulsion polymerization. Also, a method in which an ethylenic unsaturated monomer emulsified by using the stabilizer for emulsion polymerization is continuously added to a polymerization reaction system may be employed. Although the amount of the stabilizer for emulsion polymerization dispersant used is not particularly limited, the lower limit of the amount used with respect to 100 parts by mass of the ethylenic unsaturated monomer is preferably 1 part by mass, and more preferably 2 parts by mass. On the other hand, the upper limit of the amount is preferably 30 parts by mass, and more preferably 20 parts by mass.

Furthermore, when the stabilizer for emulsion polymerization is used in emulsion polymerization, a stabilizer for emulsion polymerization containing other polyvinyl alcohol polymer may be used in combination. The lower limit of the degree of saponification of the other PVA is preferably 70 mol %, and more preferably 80 mol %. On the other hand, the upper limit of the degree of saponification is preferably 99 mol %. Moreover, the lower limit of the degree of polymerization of the other PVA is preferably 300, and more preferably 500. On the other hand, the upper limit of the degree of polymerization is preferably 4,500, and more preferably 3,500.

Additionally, water resistance may be imparted to the other PVA by introducing an ethylene group, an acetoacetyl group, etc. In a case where the stabilizer for emulsion polymerization containing the other PVA is used in combination, it is impossible to readily define the weight ratio of the amount of the stabilizer for emulsion polymerization added, to the amount of the stabilizer for emulsion polymerization containing the other PVA added (the stabilizer for emulsion polymerization/the stabilizer for emulsion polymerization containing the other PVA) since it may vary depending on the type and the like of the stabilizer for emulsion polymerization employed, but this weight ratio falls within the range of preferably 95/5 to 5/95, and particularly preferably 90/10 to 10/90. These stabilizers for emulsion polymerization may be charged once at the initial stage of the emulsion polymerization, or may be charged in fractions during the emulsion polymerization.

Examples of the ethylenic unsaturated monomer include: olefin monomers such as ethylene, propylene and isobutylene; halogenated olefin monomers such as vinyl chloride, vinyl fluoride, vinylidene chloride and vinylidene fluoride; vinyl ester monomers such as vinyl formate, vinyl acetate, vinyl propionate and vinyl versatate; acrylic acid; methacrylic acid; acrylic acid ester monomers such as methyl acrylate, ethyl acrylate, butyl acrylate, 2-ethylhexyl acrylate, dodecyl acrylate and 2-hydroxyethyl acrylate; methacrylic acid ester monomers such as methyl methacrylate, ethyl methacrylate, butyl methacrylate, 2-ethylhexyl methacrylate, dodecyl methacrylate and 2-hydroxyethyl methacrylate; dimethylaminoethyl acrylate; dimethylaminoethyl methacrylate; acrylamide monomers such as acrylamide, methacrylamide, N-methylolacrylamide, N,N-dimethylacrylamide and acrylamide-2-methylpropane sulfonic acid; styrene monomers such as styrene, α-methylstyrene and p-styrenesulfonic acid; N-vinylpyrrolidone, diene monomers such as butadiene, isoprene and chloroprene; and the like.

Of these, the ethylenic unsaturated monomer is preferably a vinyl ester monomer, a (meth)acrylic acid ester monomer, and a styrene monomer, more preferably a vinyl ester monomer, and still more preferably vinyl acetate. The ethylene unsaturated monomer may be used alone of one type, or two or more types thereof may be used as a mixture.

To the aqueous emulsion, conventionally well-known additives may be added, e.g., a filler such as titanium oxide, an organic solvent such as toluene, a plasticizer such as dibutyl phthalate, a film-forming aid such as glycol ether. Alternatively, a powder emulsion, as generally referred to, may be also prepared by powder making through spray drying of aqueous emulsion. Such an aqueous emulsion and a powder emulsion can be suitably used for extensive intended usages such as various types of adhesives, paints, fiber coating agents, paper coating agents, inorganic binders, cement admixtures, mortar primers, and the like.

Stabilizer for Suspension Polymerization

The stabilizer for suspension polymerization contains the PVA (A). In addition, it is preferred that water is further contained, and other component such as a PVA other than the PVA (A) may be contained within a range not leading to impairment of the effects of the invention. By using the stabilizer for suspension polymerization, a vinyl polymer can be obtained from a vinyl monomer.

The stabilizer for suspension polymerization preferably contains water in addition to the PVA (A). Moreover, exemplary other components which may be contained in the stabilizer for suspension polymerization include additives such as a PVA other than the PVA (A), a water soluble cellulose ether, a water soluble polymer, an oil soluble emulsifying agent and a water soluble emulsifying agent, as well as a solvent and the like.

When the stabilizer for suspension polymerization contains water, a dispersion liquid or solution of the PVA (A) may be provided. As a result, the stabilizer for suspension polymerization enables the suspension polymerization of the vinyl monomer to be more easily and certainly carried out. The upper limit of the content of the PVA (A) in a case where the stabilizer for suspension polymerization is a dispersion liquid or solution of the PVA (A) is preferably 20% by mass, and more preferably 15% by mass. On the other hand, the lower limit of the content of the PVA (A) is preferably 0.1% by mass, and more preferably 0.5% by mass. When the content of the PVA (A) is greater than the upper limit, dispersion or dissolution may be insufficient. To the contrary, when the content of the PVA (A) is less than the lower limit, the suspension polymerization reaction may not be sufficient caused.

The PVA other than the PVA (A) is exemplified by: a PVA having a degree of saponification of 70 mol % or greater and less than 98.5 mol %, and a viscosity average degree of polymerization of 500 to 3500; a PVA having a degree of saponification of 20 mol % or greater and less than 60 mol %, and a viscosity average degree of polymerization of 200 to 600; and the like.

Examples of the water soluble cellulose ether include methyl cellulose, hydroxyethyl cellulose, hydroxypropyl cellulose, hydroxypropyl methyl cellulose, and the like. Examples of the water soluble polymer include gelatin, and the like.

Examples of the oil soluble emulsifying agent include sorbitan monolaurate, sorbitan trioleate, glycerin tristearate, ethylene oxide-propylene oxide block copolymers, and the like. Examples of the water soluble emulsifying agent include polyoxyethylene sorbitan monolaurate, polyoxyethylene glycerin oleate, sodium laurate, and the like.

Although the amount of these additives is not particularly limited, the amount with respect to 100 parts by mass of the vinyl compound is preferably 0.01 parts by mass or greater and 1.0 parts by mass or less.

Examples of the solvent include: lower alcohols such as methanol and ethanol; esters such as methyl acetate and ethyl acetate; ketones such as acetone and methyl ethyl ketone; aromatic hydrocarbons such as benzene and toluene; and the like. These solvents may be used alone of one type, or two or more types thereof may be used in combination.
Production Method of Stabilizer for Suspension Polymerization The production method of the stabilizer for suspension polymerization is exemplified by a method including a step of appropriately mixing the PVA (A) obtained by the aforementioned production method, and optional component(s).

Vinyl Polymer

The vinyl polymer may be obtained by suspension polymerization of a vinyl monomer. In addition, a monomer other than the vinyl monomer may be further copolymerized. The stabilizer for suspension polymerization may be suitably used in the suspension polymerization. Although the amount of the stabilizer for suspension polymerization used is not particularly limited, it is preferably 0.008 parts by mass or grater and 0.025 parts by mass or less with respect to 100 parts by mass of the vinyl monomer.

Examples of the vinyl monomer include: halogenated vinyls such as vinyl chloride; vinyl esters such as vinyl acetate and vinyl propionate; acrylic acid, methacrylic acid, acrylic acid esters, methacrylic acid esters, acrylic acid salts, methacrylic acid salts; maleic acid, fumaric acid, maleic acid esters, fumaric acid esters, maleic acid salts, fumaric acid salts; styrene, acrylonitrile, vinylidene chloride, vinyl ether; and the like.

Examples of the monomer other than the vinyl monomer include: vinyl esters such as vinyl acetate and vinyl propionate; (meth)acrylic acid esters such as methyl (meth)acrylate and ethyl (meth)acrylate; $\alpha$-olefins such as ethylene and propylene; unsaturated dicarboxylic acids such as maleic anhydride and itaconic acid; acrylonitrile, styrene, vinylidene chloride, vinyl ether; and the like.

Of these, vinyl chloride is preferably used, and it is more preferred that vinyl chloride alone is polymerized.

As the polymerization initiator for use in the suspension polymerization, those conventionally used in polymerization such as a vinyl chloride monomer may be used. The polymerization initiator is exemplified by an oil soluble or water soluble polymerization initiator. The polymerization initiator may be used alone, or two or more types may be used in combination.

Examples of the oil soluble polymerization initiator include: percarbonate compounds such as diisopropyl peroxydicarbonate, di-2-ethylhexyl peroxydicarbonate and diethoxyethyl peroxydicarbonate; perester compounds such as t-butyl peroxyneodecanate, t-butyl peroxypivalate, t-hexyl peroxypivalate and $\alpha$-cumyl peroxyneodecanate; peroxides such as acetylcyclohexylsulfonyl peroxide, 2,4,4-trimethylpentyl 2-peroxyphenoxyacetate, 3,5,5-trimethylhexanoyl peroxide and lauroyl peroxide; azo compounds such as azobis-2,4-dimethylvaleronitrile and azobis(4-2,4-dimethylvaleronitrile); and the like.

Examples of the water soluble polymerization initiator include potassium persufate, ammonium persulfate, hydrogen peroxide, cumene hydroperoxide, and the like.

The temperature in the suspension polymerization may be as low as about 20° C., or as high as exceeding 90° C. In addition, in one preferred embodiment, a polymerization container equipped with a reflux condenser may be also used in order to enhance the heat removal efficiency of the polymerization reaction system.

Moreover, upon the suspension polymerization, other additive may be added which is commonly used for suspension polymerization, in addition to the stabilizer for suspension polymerization. The additive is exemplified by additives similar to those exemplified as the other additives which may be contained in the stabilizer for suspension polymerization described above, and the like. Although the amount of these additives is not particularly limited, the amount with respect to 100 parts by mass of the vinyl monomer is preferably 0.01 parts by mass or greater and 1.0 parts by mass or less.
Coating Agent The coating agent contains the PVA (A). Also, it is preferred that (C) a crosslinking agent is further contained, and it is also preferred that the medium for dissolving or dispersing these components is water. In addition, the coating agent may contain other component such as a filler within a range not leading to impairment of the effects the invention. Moreover, by using the coating agent, a coated article that is superior in the strength can be obtained. Furthermore, the coated article has superior oil resistance, water resistance and printability.

Crosslinking Agent (C)

It is preferred that the coating agent further contains the crosslinking agent (C). By thus further containing the crosslinking agent (C), crosslinking of the PVA (A) and the like is allowed in the coating agent, and the coating film formed from the coating agent has further improved strength, oil resistance and water resistance.

The crosslinking agent (C) is not particularly limited as long as crosslinking of the PVA (A) and the like is enabled, and is exemplified by glyoxal, urea resins, melamine resins, multivalent metal salts, polyisocyanate, polyamideepichlorohydrin, and the like. Of these, in light of safety, economical efficiency and reactivity, multivalent metal salts and polyamideepichlorohydrin are particularly preferred.

The coating agent may contain an organic solvent as a solvent or a dispersion medium in addition to the water. The upper limit of the content of the organic solvent with respect to 100 parts by mass of water is preferably 50 parts by mass, and more preferably 40 parts by mass. On the other hand, the lower limit of the content with respect to 100 parts by mass of water is preferably 0 parts by mass, and more preferably 10 parts by mass. When the content of the organic solvent falls within the above range, homogeneity of the coating agent may be further improved.

Examples of the organic solvent include: alcohol solvents such as methanol and ethanol; ester solvents such as methyl acetate and ethyl acetate; ether solvents such as diethyl ether and 1,4-dioxane; ketone solvents such as acetone and diethyl ketone; glycol solvents such as ethylene glycol and propylene glycol; glycol ether solvents such as diethylene glycol monomethyl ether and propylene glycol monomethyl ether; glycol ester solvents such as ethylene glycol monomethyl ether acetate and propylene glycol monomethyl ether acetate; and the like.

Other Components

The other component which may be contained in the coating agent is exemplified by a filler, dispersant, a water soluble polymer, a synthetic resin emulsion, a plasticizer, a pH adjusting agent, a defoaming agent, a release agent, a surfactant, and the like.

Examples of the filler include kaolin, clay, calcined clay, calcium carbonate, titanium oxide, diatomaceous earth, aluminum oxide, aluminum hydroxide, synthetic aluminum silicate, synthetic magnesium silicate, polystyrene fine particles, polyvinyl acetate fine particles, urea-formalin resin fine particles, sedimentary silica, gelled silica, silica synthesized by a gas-phase method (hereinafter, referred to as "gas-phase silica"), colloidal silica, colloidal alumina, pseudoboehmite, talc, zeolite, alumina, zinc oxide, satin white, organic pigment, and the like.

Examples of the dispersant include sodium pyrophosphate, sodium hexametaphosphate, sodium polyacrylate, and the like.

Examples of the water soluble polymers include PVAs other than the PVA (A), modified PVAs other than the PVA (A), vinyl alcohol-vinyl ester copolymers, polyacrylamides, polyacrylic acids, carboxymethyl cellulose, hydroxyethyl cellulose, hydroxymethyl propyl cellulose, casein, starch such as oxidized starch, and the like.

The synthetic resin emulsion is exemplified by a styrene-butadiene copolymer latex, a polyacrylic acid ester emulsion, a polymethacrylic acid ester emulsion, a vinyl acetate-ethylene copolymer emulsion, a vinyl acetate-acrylic acid ester copolymer emulsion, and the like.

Examples of the plasticizer include glycols, glycerin, and the like. Examples of the pH adjusting agent include ammonia, sodium hydroxide (caustic soda), sodium carbonate (carbonate of soda), phosphoric acid, and the like.

The solid content concentration in the coating agent is not particularly limited, and may be appropriately adjusted depending on the intended usage and the like, and taking into consideration the coating property, the lower limit of the solid content concentration is preferably 1% by mass, and more preferably 2% by mass. On the other hand, the upper limit of the solid content concentration is preferably 65% by mass, more preferably 40% by mass, still more preferably 20% by mass, and particularly preferably 15% by mass.

Production Method of Coating Agent

The production method of the coating agent is exemplified by a method including a step of appropriately mixing the PVA (A) obtained by the aforementioned production method, and optional component(s) such as the crosslinking agent (C).

Coated Article

The coated article of the present invention is produced by applying the coating agent onto the surface of a base material. Since the coating agent is applied on the surface, the coated article is superior in the printability, water resistance and oil resistance. The coated article can be suitably used for, e.g., an thermal recording paper, a base paper for release paper, an oil resistant paper, an ink jet recording paper, and the like. Also, the coating agent may be further applied on the back face side of the base material.

The base material of the coated article may be appropriately selected depending on the intended usage, and for example, a paper, a fabric, a wooden board, a resin plate and the like may be included.

Example of the paper include: boards such as manila board, white cardboard and liner; printing papers such as a general woodfree paper, a medium quality paper and a gravure paper; and the like. Examples of the fabric include nonwoven fabric, texture, knit, and the like. Examples of the wooden board include plank, plywood, glued lamination board, and the like. Examples of the resin plate include polyvinyl chloride plate, acryl plate, and the like.

When the base material is a paper, papermaking auxiliary agents such as an organic and inorganic pigment, a paper strengthening agent, a sizing agent and a process yield-improving agent may be contained in the base material.

Although the amount of the coating agent to be applied on the surface of the base material is not particularly limited, the amount in terms of the solid content on one face of the base material is typically about 0.1 g/m$^2$ to 30 g/m$^2$.

As the production method of the coated article, a well-known method may be adopted. The procedure of applying the coating agent on the surface of the base material is not particularly limited, and a well-known coater such as a size press coater, an air knife coater, a blade coater or a roll coater may be used. Furthermore, when the base material is a paper, after applying the coating agent, an arbitrary step such as a drying step and calendaring step may be carried out as needed.

Thermal Recording Paper

The thermal recording paper includes a paper as a base material, and the coating agent is applied on the surface of the paper. Due to having the coating agent applied to form an overcoat layer, the thermal recording paper has superior water resistance, and is superior also in the strength, oil resistance and printability.

As the base material for the thermal recording paper, the paper exemplified as the base material of the coated article may be included, and of these, a printing paper is preferred. Furthermore, although the grammage of the base material of the thermal recording paper is not particularly limited, and taking into consideration the handling characteristics and the like, the lower limit of the grammage is preferably 10 g/m$^2$, and more preferably 35 g/m$^2$. On the other hand, the upper limit of the grammage is preferably 100 g/m$^2$, and more preferably 80 g/m$^2$.

The coating agent to be applied on the thermal recording paper preferably contains the filler. In addition, the lower limit of the content of the other component with respect to 100 parts by mass of the PVA (A) is preferably 50 parts by mass, and more preferably 80 parts by mass. On the other hand, the upper limit of the content is preferably 150 parts by mass, and more preferably 120 parts by mass. Furthermore, the solid content concentration of the coating agent to be applied on the thermal recording paper may be appropriately adjusted so as to fall within the range of, for example, 10% by mass or greater and 65% by mass or less.

Base Paper for Release Paper

The base paper for release paper includes a paper as a base material, and a filling layer is formed on the surface thereof by applying the coating agent. The release paper may be produced by forming an adhesion layer on the filling layer with an adhesive. Since the coating agent is used in the base paper for release paper, the filling layer has superior water resistance and oil resistance, and thus the release paper can be suitably used for adhesive labels, adhesive tapes, adhesive papers for industrial use, release papers, and the like.

As the base material for the base paper for release paper, the paper exemplified as the base material of the coated article, and the like may be included, which is preferably a woodfree paper, a medium quality paper, an alkaline paper, a glassine paper and a semi-glassine paper, and more preferably a semi-glassine paper. Furthermore, as the adhesive that constitutes the adhesion layer, a well-known adhesive may be used.

Although the grammage of the base material of the base paper for release paper is not particularly limited, taking into consideration the void filling property, handling characteristics, etc., of the base paper for release paper, the lower limit of the grammage is preferably 10 g/m$^2$, and more preferably 40 g/m$^2$. On the other hand, the upper limit of the grammage is preferably 120 g/m$^2$, and more preferably 100 g/m$^2$.

The lower limit of the solid content concentration of the coating agent to be applied on the base paper for release paper is preferably 1% by mass, and more preferably 2% by mass. On the other hand, the upper limit of the solid content concentration is preferably 15% by mass, and more preferably 10% by mass.

Oil Resistant Paper

The oil resistant paper includes a paper as a base material, and the coating agent is applied on the surface thereof. Thus, the oil resistant paper has superior oil resistance, and also is superior in the strength and water resistance. In addition, since the coating agent contains the PVA (A), superior safety is also provided. Therefore, the oil resistant paper can be suitably used as packaging materials for food and the like.

As the base material for the oil resistant paper, the paper exemplified as the base material of the coated article, and the like may be included, and a woodfree paper, a medium quality paper, an alkaline paper, a glassine paper, a semi-glassine paper, a base paper for cardboard, a base paper for white cardboard, a base paper for chipboard, and the like may be suitably used.

Although the grammage of the base material of the oil resistant paper is not particularly limited, taking into consideration the oil resistance and the like, the grammage of the base material is: preferably 20 g/m$^2$ or greater and 150 g/m$^2$ or less in the case of the oil resistant paper used as a wrapping paper; and preferably 150 g/m$^2$ or greater and 500 g/m$^2$ or less in the case of use as a box-shape molded container.

In addition, it is also preferred that such a coating agent for paper is used as a binder for fillers such as a binder for an ink-receiving layer of ink jet recording papers. In this case, the coating agent for paper preferably contains the filler as an additive. The lower limit of the content of the PVA (A) with respect to 100 parts by mass of the filler is preferably 3 parts by mass, more preferably 5 parts by mass, and still more preferably 10 parts by mass. On the other hand, the lower limit of the content is preferably 100 parts by mass, more preferably 40 parts by mass, and still more preferably 30 parts by mass.

Also, the coating agent may be used as, for example, a barrier agent, and the like. Also in this case, the coating agent for use may appropriately contain the crosslinking agent (C), the other component(s) and the like. The lower limit of the content of the other component(s) with respect to 100 parts by mass of the PVA (A) is preferably 1 part by mass. On the other hand, the upper limit of the content of the other component(s) is preferably 20 parts by mass, and more preferably 5 parts by mass. Furthermore, the solid content concentration of the coating agent for paper may be appropriately adjusted so as to fall within the range of, for example, 1% by mass or greater and 20% by mass or less.

Moreover, the coating agent may be used as a pigment coating agent for paper through adding a pigment thereto. In this instance, the lower limit of the amount of the pigment used with respect to 100 parts by mass of the PVA (A) is preferably 0.5 parts by mass, and more preferably 1 part by mass. On the other hand, the upper limit of the amount used is preferably 15 parts by weight, and more preferably 10 parts by weight.

Sizing Agent for Fibers

The sizing agent for fibers contains the PVA (A). Furthermore, it is preferred that wax is further contained. In addition, the sizing agent for fibers may further contain other component(s) such as starch within a range not leading to impairment of the effects of the invention.

Wax

The wax further improves a weaving performance of a sized yarn, and also improves a fixation performance of the sizing agent for fibers to the raw yarn, and the amount of sizing drop in dividing the sized yarns is further decreased.

Examples of the wax include: petroleum wax such as paraffin wax; synthetic wax such as polyhydric alcohol fatty acid ester and polyethylene oxide; wax of animal or plant origin such as carnauba wax, candelilla wax, yellow beeswax and rice wax; mineral wax; and the like. The wax may be used alone of one type, or two or more types thereof may be used in combination. As the wax, of these, the petroleum wax is preferred. When the petroleum wax is used, smoothness of the sized yarn is improved.

In general, the wax is used as a water-based dispersion prepared by emulsifying using a surfactant such as a nonionic surfactant or an anionic surfactant.

The upper limit of the degree of modification of the wax with respect to the total solid content in the sizing agent for fibers is preferably 20% by mass, more preferably 15% by mass, still more preferably 12% by mass, and particularly preferably 10% by mass. On the other hand, the lower limit of the content is preferably 0.5% by mass, more preferably 1% by mass, still more preferably 2% by mass, and particularly preferably 3% by mass. When the degree of modification of the wax falls within the above range, the amount of the sizing drop in dividing the sized yarns obtained by using the sizing agent for fibers is further decreased, and weaving performance are further improved.

Other Components

The other component which may be contained in the sizing agent for fibers is exemplified by water soluble polymers such as starch, a water soluble cellulose compound and a water soluble acryl sizing agent, a defoaming agent, an antistatic agent, an antiseptic agent, a mildew-proofing agent, and the like.

Examples of the starch include raw starch of corn, potato, tapioca, wheat, etc., processed starch of the same, and the like. Examples of the processed starch include alpha (gelatinized) starch, oxidized starch, esterified starch, etherified starch, graft starch, carboxymethylated starch, dialdehyde starch, cationized starch, and the like. Of these, in light of the possibility of easily gelatinization and preparing a sizing liquid, processed starch is preferred. The lower limit of the mass ratio (PVA (A)/starch) of the PVA (A) to the starch is preferably 1/99, 30/70, and more preferably 50/50. On the other hand, the upper limit of the mass ratio is preferably 90/10, more preferably 80/20, and still more preferably 75/25.

Examples of the water soluble cellulose compound include methyl cellulose, ethyl cellulose, hydroxyethyl cellulose, hydroxypropyl cellulose, carboxymethyl cellulose, and the like.

In a case where the sizing agent for fibers is used for a spun yarn, the viscosity of the sizing agent for fibers at a general sizing temperature, i.e., 70° C. or higher and 95° C. or lower is preferably 50 mPa·s or greater and 200 mPa·s or less. When the viscosity of the sizing agent for fibers falls within the above range, fluff binding of the sized yarn can be favorable. In addition, although the solid content concentration of the sizing agent for fibers is not particularly limited, the solid content concentration is preferably 3% by mass or greater and 15% by mass or less.

Production Method of Sizing Agent for Fibers

Although the production method of the sizing agent for fibers is not particularly limited, for example, the method includes a step of producing the PVA (A), and a step of mixing the PVA (A) with an optional component such as wax.

Moreover, the sizing agent for fibers of the embodiment of present invention may be efficaciously used for: resin processing of a textile; a sizing agent for washing; a sizing agent for textile printing; a binder for felt and nonwoven fabrics.

Sized Yarn

The sized yarn of the embodiment of present invention includes a raw yarn, and a binder with which the raw yarn is impregnated, wherein the binder is formed from the sizing agent for fibers.

Examples of the raw yarn before sizing include single-component yarns of cotton, polyester, rayon, hemp, nylon, wool, acryl, etc., blended yarns of these, and the like.

The method for sizing the raw yarn is not particularly limited, and may involve, for example, simultaneous slasher sizing, partially warping sizing, tape sizing, cheese sizing, and the like.

The amount of the binder (the sizing agent for fibers) adhered to the raw yarn (i.e., size pick-up) may be appropriately selected depending on the specification of the textile, as well as equipment used such as a loom and a sizing machine. The size pick-up is typically 5% by mass or greater and 25% by mass or less with respect to the amount of the raw yarn. When the size pick-up is less than the lower limit, the abrasion resistance of the fiber is deteriorated, and may lead to a failure of sufficiently reducing fluff on the fiber surface, and to an increase of thread breakage during weaving. To the contrary, when the size pick-up is greater than the upper limit, the sizing drop in the division may increase, and the production cost of the textile may be increased. The term "size pick-up" as referred to means a value determined by a method in which fluff-detaching portions during desizing and washing are calibrated as described in "Warp Sizing" (Kaname FUKADA, Teruhiko ICHIMI, published by The Textile Machinery Society of Japan, 4th edition; pages 299 to 302).

The yarn after the sizing is dried by a cylinder to give a sheet-shaped sized yarn bundle. The surface temperature of the cylinder is typically 100° C. or higher and 150° C. or lower. The sized yarn bundle dried is divided, and separated into each one sized yarn.

Production Method of Textile

The production method of a textile according to the embodiment of the present invention includes a step of weaving the yarn sized with the sizing agent for fibers. Specifically, the sized yarn after the division is taken-up on a beam for textile, and is woven by the weaving machine. Examples of the weaving machine include dry weaving machines such as a Rapier loom and an air jet loom, as well as water jet loom, and the like. Of these, an air jet loom is preferred.

The sized yarn which is subjected to the sizing with the sizing agent for fibers may be either warp or weft, and the warp is preferably sized. In order to attain a favorable opening on the weaving machine, a great tensile force is applied to the warp, and therefore, a great friction arises between the warp, and a reed, a heald and a dropper. Therefore, by using the sized yarn as the warp, the strength of the warp is enhanced, whereby the thread breakage resulting from the friction can be reduced, and thus the weaving performance is improved. Furthermore, the sizing drop in the division of the warp is reduced. As the weft, the sized yarn may be used similarly to the warp; however, a raw yarn not subjected to a particular treatment is generally used.

EXAMPLES

Hereinafter, the present invention will be described in detail by way of Examples and Comparative Examples. It is to be noted that in the following Examples and Comparative Examples, "part" and "%" are on mass basis, unless otherwise specified particularly.

In regard to physical property values of the PVA in the Examples and Comparative Examples below, they were determined according to the following methods.

Degree of Polymerization

In each Example or Comparative Example, the viscosity average degree of polymerization of the PVA (A) was determined according to a method of JIS-K6726: 1994.

Degree of Saponification

The degree of saponification of each PVA (A) was determined according to a method of JIS-K6726: 1994.

Degree of Modification

The degree of modification of each PVA (degree of modification of the unit derived from the monomer (a) in the PVA (A)) was determined according to a method with $^1$H-NMR, using a vinyl ester polymer that is a precursor of the PVA (A).

For example, when monomethyl maleate is used as the monomer (a), the degree of modification may be determined according to the following procedure. More specifically, by using n-hexane/acetone as a solvent, the vinyl ester polymer that is the precursor of the PVA (A) is reprecipitated and purified sufficiently at least three times, and thereafter the purified material thus obtained is dried at 50° C. under a reduced pressure for 2 days to produce a sample for analysis. The sample is dissolved in CDCl$_3$, and the measurement is carried out with $^1$H-NMR at room temperature. The degree of modification of S of the unit derived from the monomer (a) can be calculated from a peak α (4.7 to 5.2 ppm) derived from a methine structure of the vinyl ester unit in the vinyl ester polymer, and a peak β (3.6 to 3.8 ppm) derived from the methyl group of the methyl ester moiety of the unit derived from the monomer (a), according to the following formula:

$$S(\text{mol \%})=\{(\text{number of protons of } \beta/3)/(\text{number of proton of } \alpha+(\text{number of proton of } \beta/3))\}\times 100.$$

Preparation of PVA (B)

The PVA (A) in an amount of about 10 g was weighed into a 500 mL ground-glass Erlenmeyer flask, and 200 mL of methanol was added thereto. Thereafter, 10 mL of a 12.5 mol/L sodium hydroxide solution was added, and the mixture was stirred and heated in a 40° C. water bath for 1 hour. Next, phenolphthalein was added as an indicator, and the mixture was washed with methanol until the alkaline reaction was not found to remove sodium hydroxide. Finally the mixture was transferred onto a watch glass and dried at 105° C. for 1 hour until methanol was evaporated off to prepare the PVA (B).

Number Average Molecular Weight (Mn) and Weight Average Molecular Weight (Mw) of PVA (A) and PVA (B)

The number average molecular weight (Mn) and the weight average molecular weight (Mw) of the PVA (A) and PVA (B) were determined in terms of a polymethyl methacrylate equivalent value by a gel permeation chromatography (GPC) measurement using hexafluoroisopropanol as a mobile phase, with a differential refractive index detector. Specifically, the following conditions were employed:

GPC column: Tosoh Corporation, "GMH$_{HR}$ (S)"×2 mobile phase: hexafluoroisopropanol (containing sodium trifluoroacetate at a concentration of 20 mmol/L)

flow rate: 0.2 mL/min sample concentration: 0.100 wt/vol % amount of injected sample: 10 μL detector: differential refractive index detector standard substance: polymethyl methacrylate (for example, Agilent Technologies, "EasiVial PMMA 4 mL tri-pack")

Example 1: Production of PVA-1

Into a reactor equipped with a stirrer, a reflux condenser, a nitrogen inlet tube, a comonomer dripping port and a polymerization initiator addition port, 740 parts of vinyl acetate and 260 parts of methanol were charged, and nitrogen substitution in the system was carried out for 30 min while bubbling nitrogen. Further, monomethyl maleate was selected as the monomer (a), and nitrogen substitution in a methanol solution of monomethyl maleate (concentration: 20%) was carried out by bubbling nitrogen gas. Elevation of the temperature in the reactor was started, and when the internal temperature became 60° C., 0.25 parts of 2,2'-azobisisobutyronitrile (AIBN) were added thereto to start the polymerization. To the reactor was added the methanol solution of monomethyl maleate dropwise, and the polymerization was allowed at 60° C. for 3 hours while the monomer composition ratio in the polymerization solution was maintained constant. Thereafter, the mixture was cooled to stop the polymerization. The total amount of the monomer (a) added until the polymerization was stopped was 0.9 parts, and the solid content concentration when the polymerization was stopped was 33.3%. Subsequently, unreacted monomers were removed while adding methanol at intervals at 30° C. under a reduced pressure to obtain a methanol solution of the vinyl ester polymer (concentration: 35%). Next, to 790.8 parts of the methanol solution of the vinyl ester polymer (the polymer in the solution: 200.0 parts) prepared by further adding methanol to this methanol solution, 9.2 parts of a 10% methanol solution of sodium hydroxide were added, and saponification was allowed at 40° C. (the polymer concentration of the saponification solution: 25%; and the molar ratio of sodium hydroxide to the vinyl acetate unit in the polymer: 0.01). Since a gelatinous material was produced in about 15 min after the addition of the methanol solution of sodium hydroxide, this gelatinous matter was ground with a grinder and further left to stand at 40° C. for 1 hour to allow the saponification to proceed, and thereafter 500 parts of methyl acetate were added to neutralize remaining alkali. After completion of neutralization was ascertained by using a phenolphthalein indicator, the mixture was filtered off to obtain a white solid. To this white solid were added 2,000 parts of methanol, and the mixture was left to stand at room temperature for 3 hours to permit washing. After the washing operation was repeated three times, white solid obtained by deliquoring through centrifugation was subjected to a heat treatment at 120° C. for 4.5 hours with a dryer to give the PVA (A) (PVA-1). Physical properties of PVA-1 are shown in Table 2.

Examples 2 to 10 and Comparative Examples 1 to 10: Production of PVA-2 to PVA-20

Various types of PVAs (A) were produced by a method similar to that in Synthesis Example 1 except that: polymerization conditions such as the amount of vinyl acetate and methanol charged, the type and the amount of the monomer (a) added for use in the polymerization; saponification conditions such as the concentration of the vinyl ester polymer, the molar ratio of sodium hydroxide to the vinyl acetate unit in the saponification; and the heat treatment condition were each changed as shown in Table 1. The physical properties of each PVA (A) and the PVA (B) obtained therefrom are shown in Table 2. It is to be noted that in Synthesis Example 13, after producing two types of PVAs (A), i.e., PVA-13a and PVA-13b, the two types of PVAs (A) were mixed such that the amount of PVA-13b was 55 parts with respect to 45 parts of the PVA-13a. Moreover, it was impossible to determine the Mn and Mw of PVA-10 and PVA-12 due to a failure in complete dissolution in hexafluoroisopropanol.

TABLE 1

| | Type of PVA (A) | Amount | | monomer (a) | | amount of AIBN used (part) | Conversion (rate of polymerization) (%) | Saponification condition | | Heat treatment condition | |
|---|---|---|---|---|---|---|---|---|---|---|---|
| | | vinyl acetate (part) | methanol (part) | type | amount of addition (part) | | | vinyl acetate polymer concentration (%) | NaOH molar ratio | temperature (°C.) | time (hr) |
| Example 1 | PVA-1 | 740 | 260 | monomethyl maleate | 0.9 | 0.25 | 45 | 20 | 0.010 | 120 | 4.5 |
| Example 2 | PVA-2 | 920 | 80 | monomethyl maleate | 0.6 | 0.25 | 25 | 20 | 0.010 | 120 | 4.5 |
| Example 3 | PVA-3 | 920 | 80 | monomethyl maleate | 0.6 | 0.25 | 25 | 20 | 0.010 | 120 | 1.5 |
| Example 4 | PVA-4 | 740 | 260 | monomethyl maleate | 0.9 | 0.25 | 45 | 20 | 0.007 | 120 | 4.5 |
| Example 5 | PVA-5 | 740 | 260 | monomethyl maleate | 0.9 | 0.25 | 45 | 20 | 0.014 | 120 | 4.5 |
| Example 6 | PVA-6 | 740 | 260 | monomethyl maleate | 5.1 | 0.25 | 45 | 20 | 0.022 | 120 | 1.5 |
| Example 7 | PVA-7 | 740 | 260 | methyl methacrylate | 1.3 | 0.25 | 45 | 20 | 0.010 | 120 | 4.5 |
| Example 8 | PVA-8 | 720 | 280 | vinyltrimethoxysilane | 2.3 | 0.25 | 38 | 20 | 0.003 | 120 | 4.5 |
| Example 9 | PVA-19 | 730 | 270 | monomethyl maleate | 2.3 | 0.25 | 45 | 20 | 0.010 | 120 | 3.0 |
| Example 10 | PVA-20 | 730 | 270 | monomethyl maleate | 2.3 | 0.25 | 45 | 20 | 0.010 | 120 | 4.5 |
| Comparative Example 1 | PVA-9 | 740 | 260 | monomethyl maleate | 0.05 | 0.25 | 45 | 20 | 0.007 | 120 | 4.5 |
| Comparative Example 2 | PVA-10 | 750 | 250 | monomethyl maleate | 23.9 | 0.25 | 45 | 20 | 0.030 | 120 | 4.5 |
| Comparative Example 3 | PVA-11 | 740 | 260 | monomethyl maleate | 0.9 | 0.25 | 45 | 20 | 0.010 | 60 | 4.5 |
| Comparative Example 4 | PVA-12 | 740 | 260 | monomethyl maleate | 0.9 | 1.0 | 45 | 20 | 0.010 | 180 | 4.5 |
| Comparative Example 5 | PVA-13a | 350 | 650 | monomethyl maleate | 0.7 | 0.25 | 80 | 20 | 0.010 | 60 | 4.5 |
| | PVA-13b | 970 | 30 | monomethyl maleate | 0.3 | 0.25 | 10 | 20 | | | |
| Comparative Example 6 | PVA-14 | 740 | 260 | — | — | 0.25 | 45 | 10 | 0.007 | 120 | 4.5 |
| Comparative Example 7 | PVA-15 | 920 | 80 | — | — | 0.25 | 25 | 10 | 0.007 | 120 | 4.5 |
| Comparative Example 8 | PVA-16 | 740 | 260 | — | — | 0.25 | 45 | 10 | 0.004 | 120 | 4.5 |
| Comparative Example 9 | PVA-17 | 740 | 260 | — | — | 0.25 | 45 | 10 | 0.011 | 120 | 4.5 |
| Comparative Example 10 | PVA-18 | 740 | 260 | stearylmethacrylamide | 0.3 | 0.25 | 45 | 10 | 0.011 | 120 | 4.5 |

TABLE 2

| | Type of PVA (A) | Viscosity average degree of polymerization of PVA (A) | Degree of modification (mol %) | Degree of saponification (mol %) | Mw/Mn of PVA (A) | Mw of PVA (A) | Mw/Mn of PVA (B) | Mw of PVA (B) |
|---|---|---|---|---|---|---|---|---|
| Example 1 | PVA-1 | 1,700 | 0.2 | 88 | 3.5 | 403000 | 2.2 | 161000 |
| Example 2 | PVA-2 | 3,500 | 0.2 | 88 | 4.1 | 692000 | 2.6 | 420000 |
| Example 3 | PVA-3 | 3,500 | 0.2 | 88 | 3.3 | 650000 | 2.4 | 420000 |
| Example 4 | PVA-4 | 1,700 | 0.2 | 80 | 3.4 | 330000 | 2.3 | 161000 |
| Example 5 | PVA-5 | 1,700 | 0.2 | 95 | 3.1 | 310000 | 2.2 | 161000 |
| Example 6 | PVA-6 | 1,700 | 1.1 | 88 | 4.8 | 468000 | 2.1 | 156000 |
| Example 7 | PVA-7 | 1,700 | 0.2 | 88 | 3.4 | 324000 | 2.1 | 161000 |
| Example 8 | PVA-8 | 1,700 | 0.2 | 95 | 3.5 | 402000 | 2.2 | 167500 |
| Example 9 | PVA-19 | 1,700 | 0.6 | 88 | 5.3 | 487200 | 2.4 | 160000 |
| Example 10 | PVA-20 | 1,700 | 0.6 | 88 | 5.7 | 531500 | 2.4 | 162000 |
| Comparative Example 1 | PVA-9 | 1,700 | 0.01 | 88 | 2.3 | 195000 | 2.2 | 150000 |
| Comparative Example 2 | PVA-10 | 1,700 | 5.5 | 88 | — | — | — | — |
| Comparative Example 3 | PVA-11 | 1,700 | 0.2 | 88 | 2.3 | 193000 | 2.2 | 161000 |
| Comparative Example 4 | PVA-12 | 1,700 | 0.2 | 88 | — | — | — | — |
| Comparative Example 5 | PVA-13a PVA-13b | 1,700 | 0.2 | 88 | 8.5 | 214000 | 8.3 | 165000 |
| Comparative Example 6 | PVA-14 | 1,700 | 0 | 88 | 2.2 | 185000 | 2.1 | 167000 |
| Comparative Example 7 | PVA-15 | 3,500 | 0 | 88 | 2.3 | 480000 | 2.2 | 410000 |
| Comparative Example 8 | PVA-16 | 1,700 | 0 | 80 | 2.2 | 198000 | 2.2 | 170000 |

TABLE 2-continued

|  | Type of PVA (A) | Viscosity average degree of polymerization of PVA (A) | Degree of modification (mol %) | Degree of saponification (mol %) | Mw/Mn of PVA (A) | Mw of PVA (A) | Mw/Mn of PVA (B) | Mw of PVA (B) |
|---|---|---|---|---|---|---|---|---|
| Comparative Example 9 | PVA 17 | 1,700 | 0 | 95 | 2.2 | 170000 | 2.2 | 163000 |
| Comparative Example 10 | PVA-18 | 1,700 | 0.2 | 92 | 2.2 | 180000 | 2.2 | 163000 |

Evaluation of Thickening Agent

Examples 11 to 20 and Comparative Examples 11 to 19

Thus obtained PVAs (A) were evaluated on water solubility and thickening property when used as the thickening agent, according to the following procedure.

Water Solubility

To 4 parts of the PVA (A) obtained as described above, 96 parts of water were added, and the temperature of the mixture was elevated to 90° C. with stirring. During this process, the appearance of dissolution of the PVA (A) was visually observed. A time period from the start of the temperature rise until complete dissolution was measured, and the evaluation of the water solubility was made in accordance with the following criteria. The results of the evaluations are shown in Table 3. It is to be noted that when the evaluation was made as A or B, it is concluded that practical applicability is superior.

A: completely dissolved in less than 1 hour;
B: completely dissolved in at least 1 hour and less than 3 hours; and
C: complete dissolution failed, with undissolved material left.

Thickening Property when Added to Water

An aqueous PVA solution having a concentration of 4.0% was prepared in a similar manner to that in "Water Solubility" described above, and the viscosity (mPa·s) was measured by using a B type viscometer (rotation frequency of the rotor: 6 rpm at a temperature of 20° C.). The viscosity was measured on the PVA (A), and an unmodified PVA that serves as a comparative control. Then, each viscosity ratio (viscosity of the PVA (A)/viscosity of the unmodified PVA as a comparative control) was calculated, and the evaluation of the thickening property was made in accordance with the following criteria. In this process, the unmodified PVA used as the comparative control had the same degree of saponification as that of the PVA (A) in each Example or Comparative Example, and exhibited the same viscosity average degree of polymerization as that of the PVA (B) obtained from the PVA (A). The results of the evaluation are shown in Table 3.

A: 1.5 or greater;
B: 1.1 or greater and less than 1.5; and
C: 1.0 or greater and less than 1.1, or measurement failed.

Thickening Property when Added to Emulsion Composition

To 100 parts of an ethylene-vinyl acetate copolymer emulsion (Kuraray Co., Ltd., "OM-4200NT", total solid content: 55.0%) were added 50 parts of an aqueous PVA solution (concentration: 10%) to prepare a mixed liquid of the PVA and the emulsion. The viscosity (mPa·s) of this mixed liquid was measured by using a B type viscometer (rotation frequency of the rotor: 2 rpm at a temperature of 20° C.). The viscosity was measured on the PVA (A), and an unmodified PVA that serves as a comparative control. Then, each viscosity ratio (viscosity when the PVA (A) was used/viscosity when the unmodified PVA as a comparative control was used) was calculated, and the evaluation of the thickening property was made in accordance with the following criteria. In this process, the unmodified PVA used as the comparative control had the same degree of saponification as that of the PVA (A) in each Example or Comparative Example, and exhibited the same viscosity average degree of polymerization as that of the PVA (B) obtained from the PVA (A). The results of the evaluation are shown in Table 3.

A: 1.5 or greater;
B: 1.2 or greater and less than 1.5; and
C: 1.0 or greater and less than 1.2.

TABLE 3

|  |  |  | Thickening property | | | | | |
|---|---|---|---|---|---|---|---|---|
|  |  |  | added to water | | | added to emulsion composition | | |
|  | Type of PVA (A) | Water solubility | viscosity of 4% aqueous solution (mPa·s) | viscosity ratio | evaluation | emulsion viscosity (mPa·s) | viscosity ratio | evaluation |
| Example 11 | PVA-1 | A | 45 | 1.7 | A | 4400 | 1.9 | A |
| Example 12 | PVA-2 | A | 580 | 5.1 | A | 60800 | 7.4 | A |
| Example 13 | PVA-3 | A | 195 | 1.7 | A | 18200 | 2.2 | A |
| Example 14 | PVA-4 | A | 49 | 1.8 | A | 4600 | 2.0 | A |
| Example 15 | PVA-5 | A | 43 | 1.7 | A | 4200 | 1.8 | A |
| Example 16 | PVA-6 | B | 92 | 3.5 | A | 6700 | 2.9 | A |
| Example 17 | PVA-7 | A | 46 | 1.8 | A | 4300 | 1.8 | A |
| Example 18 | PVA-8 | A | 46 | 1.8 | A | 4500 | 1.9 | A |
| Example 19 | PVA-19 | B | 94 | 3.6 | A | 6792 | 2.9 | A |
| Example 20 | PVA-20 | B | 99 | 3.8 | A | 7260 | 3.1 | A |

TABLE 3-continued

| | | | Thickening property | | | | | |
| | | | added to water | | | added to emulsion composition | | |
| | Type of PVA (A) | Water solubility | viscosity of 4% aqueous solution (mPa · s) | viscosity ratio | evaluation | emulsion viscosity (mPa · s) | viscosity ratio | evaluation |
|---|---|---|---|---|---|---|---|---|
| Comparative Example 11 | PVA-9 | A | 27 | 1.0 | C | 2300 | 1.0 | C |
| Comparative Example 12 | PVA-10 | C | not completely dissolved | — | C | — | — | C |
| Comparative Example 13 | PVA-11 | A | 26 | 1.0 | C | 2350 | 1.0 | C |
| Comparative Example 14 | PVA-12 | C | not completely dissolved | — | C | — | — | C |
| Comparative Example 15 | PVA-13a PVA-13b | A | 26 | 1.0 | C | 2600 | 1.1 | C |
| Comparative Example 16 | PVA-14 | A | 26 | 1.0 | C | 2342 | 1.0 | C |
| Comparative Example 17 | PVA-15 | A | 113 | 1.0 | C | 8256 | 1.0 | C |
| Comparative Example 18 | PVA-16 | A | 27 | 1.0 | C | 2342 | 1.0 | C |
| Comparative Example 19 | PVA-17 | A | 26 | 1.0 | C | 2342 | 1.0 | C |

As shown in Table 3, the thickening agents of Examples 11 to 20 were proven to be superior in both the water solubility and the thickening property. Furthermore, the thickening agents of Examples 12, 16, 19 and 20 on which the degree of modification, ratio (Mw/Mn) of the PVA (A) and the like were specified were proven to be particularly superior in the thickening property.

On the other hand, Comparative Examples 11, 13 and 15 to 19 in which the ratio (Mw/Mn) of the PVA (A) was less than 3 or greater than 8, were found to have a poor thickening property. In addition, when the degree of modification was high (Comparative Example 12), and when the heating temperature was high (Comparative Example 14), the water solubility was inferior, leading to a failure in complete dissolution in water.

Evaluation of Stabilizer for Emulsion Polymerization

Example 21

Emulsion Polymerization of Polyvinyl Acetate

Into a 1 L glass polymerization container equipped with a reflux condenser, a dropping funnel, a thermometer and a nitrogen blowing port, 350 g of ion exchanged water and 12.6 g of PVA-1 were charged, which was completely dissolved at 95° C. Next, after the aqueous PVA solution was cooled and substituted with nitrogen, thereto was added 16.8 g of vinyl acetate with stirring at 200 rpm, and the temperature was elevated to 60° C. Thereafter, 5% hydrogen peroxide 4.6 g/20% tartaric acid 2.0 g as a redox type initiator was added thereto to start the polymerization. From 15 min later than the initiation of the polymerization, 151.6 g of vinyl acetate was continuously added over 3 hours, and thereafter 5% hydrogen peroxide 0.6 g/20% tartaric acid 0.2 g was added to complete the polymerization, whereby a polyvinyl acetate emulsion having a solid content concentration of 34.8% and a particle size of 2 μm was obtained.

Examples 22 to 28 and Comparative Examples 20 to 28

Polyvinyl acetate emulsions were produced in a similar manner to that of Example 21 except that the type of the PVA (A) used as described above was changed as shown in Table 4. Each solid content concentration of these polyvinyl acetate emulsions is shown in Table 3 together. It is to be noted that in Comparative Example 21 and Comparative Example 23, PVA-10 and PVA-12 were not completely dissolved in ion exchanged water, and thus it was impossible to obtain a polyvinyl acetate emulsion.

Dispersibility During Emulsion Polymerization

The resultant polyvinyl acetate emulsions were observed on a system microscope (Olympus Corporation, "EX-53"), and evaluated as: "A" when aggregation or gelation was absent, and filtration residue was not found; when aggregation or gelation was absent, but filtration residue was slightly found; and "C" when aggregation or gelation was present, and a large amount of filtration residues were found. The results of the evaluations are shown in Table 4 together. It is to be noted that less aggregation or gel, and less filtration residue indicates superior the dispersibility during the emulsion polymerization.

Viscosity of Polyvinyl Acetate Emulsion

With respect to 100 parts by mass of the solid content of the polyvinyl acetate emulsions of Examples and Comparative Examples 5 parts by mass of dibutyl phthalate as a plasticizer were admixed. The mixture was subjected to measurements of: the viscosity (η at 2 rpm) under a condition at 30° C. and 2 rpm, and 30° C.; and the viscosity (η at 20 rpm) under a condition at 20 rpm, by using a BH type viscometer (Toki Sangyo Co., Ltd, "BIT type viscometer"). The results of the evaluations are shown in Table 4 together.

Coating Film Strength of Polyvinyl Acetate Emulsion

The polyvinyl acetate emulsions of Examples and Comparative Examples were flow casted on PET in an environment at a temperature of 20° C. and a relative humidity of 65%, followed by drying for 7 days to obtain a dry coating film having a thickness of 500 μm. The coating film was cut to give a piece having a width of 1 cm and a length of 6 cm, which was subjected to a tensile test under a condition involving a tension speed of 100 mm/min by using a Precision Universal Testing Machine (Shimadzu Corporation, "Autograph AG-IS") to determine the strength of the coating film. The results of the evaluations are shown in Table 4 together.

Production of Vinyl Chloride Polymer

Into a 5 L autoclave, the stabilizer for suspension polymerization, 0.65 parts of a 70% toluene solution of cumyl peroxyneodecanoate, and 1.05 parts of a 70% toluene solution of t-butylperoxyneododecanate were charged, and after degassing to remove oxygen such that the pressure in the autoclave was lowered to 0.0067 MPa, 940 parts of vinyl chloride monomer were added. The content of PVA-1 with respect to the vinyl chloride monomer was 200 ppm, and the

TABLE 4

| | Type of PVA (A) | Solid content (%) | Dispersibility in Emulsion Polymerization | Viscosity | | Coating film strength (kg/cm$^2$) |
|---|---|---|---|---|---|---|
| | | | | η at 2 rpm (mPa · s) | η at 20 rpm (mPa · s) | |
| Example 21 | PVA-1 | 34.8 | A | 36000 | 11000 | 189.6 |
| Example 22 | PVA-2 | 34.6 | A | 86000 | 26700 | 191.3 |
| Example 23 | PVA-3 | 34.2 | A | 54500 | 17000 | 197.5 |
| Example 24 | PVA-4 | 35.1 | A | 41600 | 13000 | 191.2 |
| Example 25 | PVA-5 | 35.2 | A | 25600 | 13000 | 188.6 |
| Example 26 | PVA-6 | 35.0 | A | 45000 | 14200 | 201.8 |
| Example 27 | PVA-7 | 35.1 | A | 32000 | 10000 | 189.9 |
| Example 28 | PVA-8 | 35.0 | A | 29000 | 16000 | 190.7 |
| Comparative Example 20 | PVA-9 | 34.9 | A | 8600 | 2750 | 120.8 |
| Comparative Example 21 | PVA-10 | — | — | — | — | — |
| Comparative Example 22 | PVA-11 | 34.8 | A | 10800 | 3500 | 128.9 |
| Comparative Example 23 | PVA-12 | — | — | — | — | — |
| Comparative Example 24 | PVA-13a PVA-13b | 34.8 | B | 8200 | 2600 | 152.4 |
| Comparative Example 25 | PVA-14 | 34.9 | A | 9000 | 2900 | 121.2 |
| Comparative Example 26 | PVA-15 | 34.3 | B | 21000 | 6500 | 136.7 |
| Comparative Example 27 | PVA-16 | 34.2 | C | 15000 | 3800 | 111.3 |
| Comparative Example 28 | PVA-17 | 35.0 | B | 3400 | 1700 | 114.8 |

As shown in Table 4, stabilizers for emulsion polymerization of Examples 21 to 28 were proven to be superior in the dispersibility during the emulsion polymerization. In addition, the polyvinyl acetate emulsions obtained in Examples 21 to 28 were highly viscous, and it was also proven that the coating films formed from these polyvinyl acetate emulsions were superior in the strength.

On the other hand, the stabilizers for emulsion polymerization of Comparative Examples 20 to 28 were proven to be inferior in the dispersibility during the emulsion polymerization, and also the viscosity of the resulting polyvinyl acetate emulsions as well as the strength of the coating films formed from the polyvinyl acetate emulsions were also unsatisfactory. Moreover, the PVAs of Comparative Examples 21 and 23 in particular, were unusable as the stabilizer for emulsion polymerization.

Evaluation of Stabilizer for Suspension Polymerization

Example 29

Preparation of Stabilizer for Suspension Polymerization

PVA-1 in an amount of 0.188 parts by mass and 0.564 parts by mass of PVA-L-10 (Kuraray Co., Ltd., degree of saponification: 72.5 mol %; and the viscosity of a 4% aqueous solution: 6 mPa·s) were dissolved in 60 parts by mass of deionized water to prepare a stabilizer for suspension polymerization.

content of PVA-L-10 with respect to the vinyl chloride monomer was 600 ppm. Then, the temperature of the mixture in the autoclave was elevated to 57° C., and the polymerization of the vinyl chloride monomer was started under stirring. The pressure inside the autoclave at the initiation of the polymerization was 0.80 MPa. Three and half hour later following the initiation of the polymerization, the polymerization was stopped when the internal pressure of the autoclave became 0.70 MPa, and unreacted vinyl chloride monomers were removed and the polymerization reaction product was recovered. The polymerization reaction product was dried at 65° C. for 16 hours to obtain a vinyl chloride polymer.

Examples 30 to 38 and Comparative Examples 29 to 37

Vinyl chloride polymers were produced in a similar manner to that in Example 29 except that the type and the amount of addition of the PVA (A) used as described above was changed as shown in Table 5. It is to be noted that in Comparative Example 30 and Comparative Example 32, PVA-10 and PVA-12 were not completely dissolved in deionized water, and thus it was impossible to obtain a vinyl chloride polymer.

Polyvinyl chloride acetate polymers of Examples and Comparative Examples were evaluated on particle grade distribution, bulk density and the amount of remaining PVA in polymerization wastewater according to the following method. The results of the evaluations are shown in Table 5.
Particle Size Distribution The particle grade distribution was evaluated by: sieving the vinyl chloride polymer on a sieve having a nominal mesh opening size width of 250 µm according to JIS-Z8801-1; determining a ratio of the matter remaining on the sieve; and deciding in accordance with the following criteria. It is to be noted that a less amount of the remaining matter on the sieve indicates superior polymerization stability during the suspension polymerization due to less coarse particles included, leading to sharp particle size distribution.

A: less than 5% by mass;
B: 5% by mass or greater and less than 10% by mass; and
C: 10% by mass or greater.

Bulk Density

The bulk density was measured according to JIS-K6720-2, and evaluated in accordance with the following criteria.

A: 0.54 g/mL or greater;
B: 0.48 g/mL or greater and less than 0.54 g/mL; and
C: less than 0.48 g/mL.

Remaining PVA in Polymerization Wastewater

The remaining PVA in the polymerization wastewater was evaluated in accordance with the following criteria depending on the degree of foaming, through a visual inspection of the polymerization wastewater after recovering the polymerization reaction product. It is to be noted that a smaller degree of foaming indicates less remaining PVA in polymerization wastewater.

A: not foaming;
B: slightly foaming; and
C: foaming.

ization stability during the suspension polymerization and has a high bulk density. Furthermore, the amount of remaining PVA in the polymerization wastewater was also decreased. Particularly, according to the stabilizers for suspension polymerization of Examples 37 and 38, superior effects can be achieved with a lower using amount, thereby enabling the production cost of the vinyl chloride polymer to be reduced.

On the other hand, according to the stabilizers for suspension polymerization of Comparative Examples 29 to 37, it was impossible to sufficiently satisfy all of the polymerization stability, the bulk density and the remaining PVA during the suspension polymerization. Particularly, the PVAs in Comparative Examples 30 and 32 were useless as the stabilizer for suspension polymerization.

Evaluation of Coating Agent

Example 39

Preparation of Coating Agent

Kaolin clay (Engelhard, "UW-90") was dispersed in water so as to give a concentration of 40%, and the dispersion was mixed with a home mixer for 10 min to prepare a dispersion liquid.

Next, a 10% aqueous PVA solution was prepared by using PVA-1, and the aqueous PVA solution and the kaolin dispersion liquid were mixed such that the solid content in the kaolin dispersion liquid became 60 parts with respect to 40 parts of the solid content in the aqueous PVA solution. Thereafter, water was mixed such that the solid content concentration in the mixed solution was 15% to obtain a coating agent.

TABLE 5

| | Type of PVA (A) | Amount of PVA (A) added | | Particle size distribution | Bulk density | Remaining PVA of wastewater in polymerization |
|---|---|---|---|---|---|---|
| | | ppm | parts by mass | | | |
| Example 29 | PVA-1 | 200 | 0.188 | A | A | A |
| Example 30 | PVA-2 | 200 | 0.188 | A | A | A |
| Example 31 | PVA-3 | 200 | 0.188 | A | A | A |
| Example 32 | PVA-4 | 200 | 0.188 | B | A | A |
| Example 33 | PVA-5 | 200 | 0.188 | A | A | B |
| Example 34 | PVA-6 | 200 | 0.188 | B | A | A |
| Example 35 | PVA-7 | 200 | 0.188 | B | A | A |
| Example 36 | PVA-8 | 200 | 0.188 | B | A | A |
| Example 37 | PVA-2 | 100 | 0.094 | A | A | A |
| Example 38 | PVA-3 | 150 | 0.141 | A | A | B |
| Comparative Example 29 | PVA-9 | 200 | 0.188 | B | B | B |
| Comparative Example 30 | PVA-10 | — | — | — | — | — |
| Comparative Example 31 | PVA-11 | 20 | 0.019 | B | B | A |
| Comparative Example 32 | PVA-12 | — | — | — | — | — |
| Comparative Example 33 | PVA-13a PVA-13b | 200 | 0.188 | B | B | B |
| Comparative Example 34 | PVA-14 | 200 | 0.188 | B | B | B |
| Comparative Example 35 | PVA-15 | 200 | 0.188 | A | B | B |
| Comparative Example 36 | PVA-16 | 200 | 0.188 | C | B | A |
| Comparative Example 37 | PVA-17 | 200 | 0.188 | B | B | C |

As shown in Table 5, the stabilizers for suspension polymerization of Examples 29 to 38 enable a vinyl chloride polymer to be obtained which is superior in the polymer- Production of Coated Paper A base paper for coated paper having a grammage of 70 g/m² was heated to 60° C., and the aforementioned coating agent was applied by hand on one surface of the base paper by using a Meyer bar. The amount of this coating agent to be applied was 1.0 g/m² on one face of a paper base material, in terms of the solid content equivalent. Next, the coating agent was dried by using a hot-air dryer at 100° C. for 3 min, and subjected to humidity conditioning at 20° C. and a relative humidity of 65% for 72 hours to give a coated paper that includes a coating layer on the surface of the paper base material.

Examples 40 to 50, Comparative Examples 38 to 48

Coated papers were produced through preparing the coating agent in a similar manner to Example 39 except that the PVA (A) and the crosslinking agent used were changed as listed in Table 6.

The crosslinking agents used in Examples 47 to 50 and Comparative Example 47 are as shown below.

C-1: ammonium zirconium carbonate (Daiichi Kigenso Kagaku Kogyo Co., Ltd., "C-7")

C-2: zirconium oxynitrate (Daiichi Kigenso Kagaku Kogyo Co., Ltd., "Zircosol ZN")

C-3: titanium lactate (Matsumoto Fine Chemical Co. Ltd., "TC-315")

C-4: polyamideepichlorohydrin (Ashland Inc., "Polycup 172")

The coating agents and coated papers of Examples and Comparative Examples described above were evaluated in accordance with the following criteria. The results of the evaluations are shown in Table 6.

Storage Stability of Coating Agent Preparation

After a 4% PVA aqueous solution was prepared, it was stored at 40° C., and each viscosity at immediately after the preparation and one month later was measured. Based on the results, the rate of viscosity change=(viscosity at one month later/viscosity at immediately after the preparation) was determined, and the evaluation of the storage stability was made in accordance with the following criteria.

A: the rate of viscosity change being 0.8 or greater and 1.0 or less; and

B: the rate of viscosity change being less than 0.7.

Surface Strength (Wet Picking Method)

After the face of the coated paper on which the coating agent was applied (hereinafter, may be referred to as "surface") was made wet with water at 20° C., the state of generation of picking was observed by using an RI testing machine (manufactured by Akira Seisakusho Co., Ltd.), and the evaluation of the surface strength (coating film strength) was made in accordance with the following criteria. It is to be noted that the when the evaluation result falls under the criteria A to C, it can be decided that the coated paper is suited for practical applications.

A: picking not generated;
B: picking very slightly generated;
C: picking considerably generated;
D: picking generated on almost the entire face; and
E: picking generated on the entire face.

Oil Resistance

Salad oil in a volume of 0.1 mL was dropped on the surface of the coated paper, and left to stand at 20° C. for 10 min. The oil was wiped away with gauze, and the strike through to the paper was visually inspected to evaluate the oil resistance in accordance with the following criteria.

A: no strike through found;
B: strike through partially found; and
C: strike through found.

Water Resistance (Wet Rubbing Method)

Ion exchanged water at 20° C. in an amount of about 0.1 mL was dropped on the surface of the coated paper, and rubbed several times with a fingertip. The state of the elution of the coating was observed to evaluate the water resistance in accordance with the following criteria. It is to be noted that when the evaluation result falls under the criteria A to C, it can be decided that the coated paper has the water resistance suited for practical applications.

A: being superior in water resistance, without slime feel;
B: slime feel present, but the coating layer not altered;
C: a part of the coating agent being emulsified;
D: the entire coating agent being emulsified; and
E: the coating agent being dissolved.

Printability

A snap dry ink (Dainippon Ink And Chemicals, Incorporated) was applied on the surface of the coated paper by using an RI printability tester to give an average film thickness of 5 μm, and the printability was evaluated in accordance with the following criteria.

A: the print density being high, without uneven print density found, and with a clear boundary between the printed part and the non-printed part;

B: the print density being somewhat high, with some uneven print density found, and with some bleeding found on the printed part and with somewhat indefinite boundary between the printed part and the non-printed part; and C: the print density being low, with uneven print density considerably found and with considerable bleeding found on the printed part and with indefinite boundary between the printed part and the non-printed part.

TABLE 6

| | | Crosslinking agent | | Coating agent | | Coated paper | | | |
|---|---|---|---|---|---|---|---|---|---|
| | Type of PVA (A) | type | amount of addition (parts by mass) | viscosity (mPa · s) | storage stability | surface strength | oil resistance | water resistance | printability |
| Example 39 | PVA-1 | — | — | 45 | A | B | B | B | A |
| Example 40 | PVA-2 | — | — | 580 | A | B | B | B | A |
| Example 41 | PVA-3 | — | — | 195 | A | B | B | C | A |
| Example 42 | PVA-4 | — | — | 49 | A | C | B | C | B |
| Example 43 | PVA-5 | — | — | 43 | A | C | B | B | A |
| Example 44 | PVA-6 | — | — | 92 | A | C | B | C | A |
| Example 45 | PVA-7 | — | — | 46 | A | C | B | C | A |
| Example 46 | PVA-8 | — | — | 46 | A | C | B | B | A |

TABLE 6-continued

| | Type of PVA (A) | Crosslinking agent type | Crosslinking agent amount of addition (parts by mass) | Coating agent viscosity (mPa·s) | Coating agent storage stability | Coated paper surface strength | Coated paper oil resistance | Coated paper water resistance | Coated paper printability |
|---|---|---|---|---|---|---|---|---|---|
| Example 47 | PVA-1 | C-1 | 5 | 45 | A | B | A | A | B |
| Example 48 | PVA-1 | C-2 | 5 | 45 | A | A | A | A | A |
| Example 49 | PVA-1 | C-3 | 5 | 45 | A | B | A | A | A |
| Example 50 | PVA-1 | C-4 | 5 | 45 | A | A | A | A | A |
| Comparative Example 38 | PVA-9 | — | — | 27 | A | E | C | E | C |
| Comparative Example 39 | PVA-10 | — | — | not completely dissolved | B | — | — | — | — |
| Comparative Example 40 | PVA-11 | — | — | 26 | A | D | C | D | C |
| Comparative Example 41 | PVA-12 | — | — | not completely dissolved | B | — | — | — | — |
| Comparative Example 42 | PVA-13a PVA-13b | — | — | 26 | B | E | C | E | C |
| Comparative Example 43 | PVA-14 | — | — | 26 | A | E | C | E | C |
| Comparative Example 44 | PVA-15 | — | — | 113 | A | D | C | D | C |
| Comparative Example 45 | PVA-16 | — | — | 27 | A | E | C | E | C |
| Comparative Example 46 | PVA-17 | — | — | 26 | A | D | C | E | C |
| Comparative Example 47 | PVA-9 | C-1 | 5 | 27 | A | E | C | D | C |
| Comparative Example 48 | PVA-18 | — | — | 120 | B | E | C | E | C |

As shown in Table 6, any one of the coating agents of Examples 39 to 50 was superior in storage stability, and the coated paper on which the coating agent was applied had the coating film strength, the oil resistance, the water resistance and the printability, which were each sufficiently satisfactory for practical applications.

On the other hand, some of the coating agents of Comparative Examples 38 to 48 exhibited lack in the storage stability, and the coated papers on which the coating was applied were inferior in all the coating film strength, the oil resistance, the water resistance and the printability. Additionally, the PVAs in Comparative Examples 39 and 41, in particular, were unusable for the coating.

Evaluation of Sizing Agent for Fibers

Example 51

Preparation of Sizing Agent for Fibers, Sizing and Weaving

A sizing agent for fibers was prepared by using water as a solvent, such that the concentration of PVA-1 was 7% by mass, and the concentration of the wax (Kan-ei Sangyo Co., Ltd, "NC-204") was 0.7% by mass.

Sizing was carried out under the following conditions by using the sizing agent for fibers prepared as described above.
  sizing machine: two-box two-sheet type (Tsudakoma Corporation)
  sizing temperature: 90° C.
  squeeze roll width: 1,800 mm
  squeeze load: 800 kg/1,800 mm width
  warp raw yarn: cotton yarn (Toyobo Co., Ltd., "Kingyo (Gold Fish) C40/1")
  warp speed: 60 yard/min
  drying temperature: 100° C. to 130° C.
  sized yarn length: 5,600 yard By using the sized yarn as a warp, weaving was carried out under the following condition.
  weft: cotton yarn (Toyobo Co., Ltd., "Kingyo C40/1")
  warp density: 136 yarns/inch
  weft density: 72 yarns/inch
  weaving width: 47 inch
  warp total number: 6420 yarns
  weave structure: broad
  loom: air jet loom (Tsudakoma Corporation, "AZA-209i")
  loom rotation frequency: 600 rpm Examples 52 to 58 and Comparative Examples 49 to 57

Sizing agents for fibers were prepared, and sizing and weaving were carried out in a similar manner to Example 51 except that the PVA (A) used was changed as listed in Table 7. It is to be noted that in Comparative Examples 50 and 52, PVA-10 and PVA-12 were not completely dissolved in water, and thus preparation of the sizing agent for fibers failed.

The sized yarns and textiles of Examples and Comparative Examples described above were evaluated in accordance with the following criteria. The results of the evaluations are shown in Table 7.

Sizing Drop

The yarn sized by the aforementioned method was humidity-conditioned at 20° C. and 40% RH (relative humidity), and the extent of the detachment of the sizing agent onto the loom (reed, heald, dropper unit, etc.) when the weaving in the length of 3,000 m was carried out under the weaving condition described above was visually observed to evaluate in accordance with the following criteria.
A: very little;
B: little; and
C: plenty.

Weaving Performance

The yarn sized by the method described above was subjected to humidity conditioning at 20° C. and 40% RH (relative humidity), and woven for three days under the aforementioned weaving condition. The weaving performance in this procedure was evaluated on the basis of the average weaving efficiency and the warp cleavage.

Average Weaving Efficiency

The average weaving efficiency was evaluated by using a value derived by dividing the weaving length per a unit weaving time by the theoretical weaving length.
A: 93% or greater;
B: 85% or greater and less than 93%; and
C: less than 85%

Warp Cleavage

The warp cleavage was evaluated by using the average number of times of the thread breakage that occurred per a unit weaving time.
A: less than 0.4 time/hour
B: 0.4 time/hour or greater and less than 1 time/hour
C: 1 time/hour or greater Desizing Property After the woven fabric obtained as described above was treated in a 0.1% aqueous sodium hydroxide solution at 60° C. for 30 min, the alkali was rinsed with warm running water at 40° C. for 1 min. After drying, the desizing property was evaluated on the basis of coloring with iodine, in accordance with the following evaluation criteria.
A: colored portion not found on the entire face;
B: colored portion found in part; and
C: colored portion found in patches on the entire face.

TABLE 7

| | | | Results of evaluations | | |
| | | Size | weaving performance | | |
| | Type of PVA (A) | pick-up (%) | sizing drop | average weaving efficiency | warp cleavage | desizing property |
|---|---|---|---|---|---|---|
| Example 51 | PVA-1 | 10.8 | A | A | A | A |
| Example 52 | PVA-2 | 10.8 | B | A | A | B |
| Example 53 | PVA-3 | 10.7 | A | A | B | B |
| Example 54 | PVA-4 | 10.6 | A | A | A | B |
| Example 55 | PVA-5 | 10.7 | A | A | B | A |
| Example 56 | PVA-6 | 10.8 | B | A | A | B |
| Example 57 | PVA-7 | 10.7 | A | A | A | A |
| Example 58 | PVA-8 | 10.6 | A | A | B | A |
| Comparative Example 49 | PVA-9 | 10.9 | A | B | B | B |
| Comparative Example 50 | PVA-10 | — | — | — | — | — |
| Comparative Example 51 | PVA-11 | 10.7 | A | B | B | B |
| Comparative Example 52 | PVA-12 | — | — | — | — | — |
| Comparative Example 53 | PVA-13a PVA-13b | 10.7 | C | B | C | B |
| Comparative Example 54 | PVA-14 | 11.0 | A | B | B | B |
| Comparative Example 55 | PVA-15 | 10.8 | B | B | B | B |
| Comparative Example 56 | PVA-16 | 10.8 | A | A | B | C |
| Comparative Example 57 | PVA-17 | 10.8 | A | B | C | B |

In Table 7, the value of size pick-up is determined by a method in which fluff-detaching portions during desizing and washing are calibrated as described in "Warp Sizing" (Kaname FUKADA, Teruhiko ICHIMI, published by The Textile Mechinery Society of Japan, 4th edition; pages 299 to 302).

As shown in Table 7, the sized yarns produced by using the sizing agent for fibers of Examples 51 to 58 were proven to be accompanied by less sizing drop in the division, and to be superior in the weaving performance and desizing property. On the other hand, the sized yarns produced by using the sizing agents for fibers of Comparative Examples 49 to 57 were proven to be accompanied by frequent sizing drop in the division, and also have insufficient weaving performance and desizing property. In addition, the PVAs used in Comparative Examples 50 and 52, in particular, were unusable as the sizing agent for fibers.

INDUSTRIAL APPLICABILITY

As explained in the foregoing, the vinyl alcohol polymer of the aspect of the present invention has water solubility and a thickening property in a well-balanced manner, and additionally, leads to superior strength of the dry coating film. Therefore, the vinyl alcohol polymer can be suitably used for thickening agents for use in water-based solutions and water-based emulsion solutions such as paints, cements, concretes, adhesives, binders and cosmetics, as well as stabilizers for emulsion polymerization, stabilizers for suspension polymerization, coating agents and sizing agents for fibers.

The invention claimed is:

1. A vinyl alcohol polymer, wherein:
   a ratio (Mw/Mn) of a weight average molecular weight (Mw) to a number average molecular weight (Mn) of the vinyl alcohol polymer is in a range of 3 to 8;
   the vinyl alcohol polymer comprises a branched structure formed by binding, the binding being cleavable under an alkaline condition; and
   when the vinyl alcohol polymer is treated at 40° C. for 1 hour in a sodium hydroxide solution to cleave the binding, a resulting vinyl alcohol polymer has a ratio (Mw/Mn) of 2 or greater and less than 3.

2. The vinyl alcohol polymer according to claim 1, obtained by:
   polymerizing a vinyl ester monomer in the presence of at least one monomer selected from the group consisting of a carboxylic acid having an unsaturated double bond, an alkyl ester thereof, an acid anhydride thereof, and a salt thereof, and a silyl compound having an unsaturated double bond; and
   thereafter saponifying and carrying out a heat treatment of the polymerization product at a temperature of 70° C. to 150° C.

3. A thickening agent comprising the vinyl alcohol polymer according to claim 1.

4. A stabilizer comprising the vinyl alcohol polymer according to claim 1, wherein the stabilizer is suitable for emulsion polymerization.

5. The stabilizer according to claim 4, further comprising water.

6. A stabilizer comprising the vinyl alcohol polymer according to claim 1, wherein the stabilizer is suitable for suspension polymerization.

7. The stabilizer according to claim 6, further comprising water.

8. A coating agent comprising the vinyl alcohol polymer according to claim 1.

9. The coating agent according to claim 8, further comprising a crosslinking agent.

10. A coated article produced by applying the coating agent according to claim 8 on a surface of a base material.

11. The coated article according to claim 10, which is a thermal recording paper.

12. The coated article according to claim 10, which is a base paper for release paper.

13. The coated article according to claim 10, which is an oil resistant paper.

14. A sizing agent comprising the vinyl alcohol polymer according to claim 1.

15. The sizing agent according to claim 14, further comprising a wax.

16. A sized yarn comprising a raw yarn, and a binder with which the raw yarn is impregnated, wherein the binder comprises the sizing agent according to claim 14.

17. A method of producing a textile, comprising weaving the sized yarn according to claim 16.

18. The vinyl alcohol polymer according to claim 1, comprising a unit derived from at least one monomer selected from the group consisting of a carboxylic acid having an unsaturated double bond, an alkyl ester of the carboxylic acid, an acid anhydride of the carboxylic acid, a salt of the carboxylic acid, and a silyl compound having an unsaturated double bond, wherein the unit is present in an amount of 0.02 to 5 mol % based on a total number of moles of all monomer units constituting the vinyl alcohol polymer.

* * * * *